United States Patent
Jang et al.

(10) Patent No.: US 9,734,338 B2
(45) Date of Patent: Aug. 15, 2017

(54) SYSTEM ON CHIP TO PERFORM A SECURE BOOT, AN IMAGE FORMING APPARATUS USING THE SAME, AND METHOD THEREOF

(71) Applicant: SAMSUNG Electronics Co., Ltd., Suwon-si, Gyeonggi-do (KR)

(72) Inventors: Tae-hong Jang, Seongnam-si (KR); Jong-seung Lee, Suwon-si (KR); Jin-hwi Jun, Suwon-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 166 days.

(21) Appl. No.: 14/098,893

(22) Filed: Dec. 6, 2013

(65) Prior Publication Data
US 2014/0164725 A1   Jun. 12, 2014

Related U.S. Application Data

(63) Continuation-in-part of application No. 13/848,864, filed on Mar. 22, 2013, now abandoned.
(Continued)

(30) Foreign Application Priority Data

Mar. 19, 2013  (KR) .......... 10-2013-0029218
Aug. 1, 2013   (KR) .......... 10-2013-0091667

(51) Int. Cl.
*G06F 21/57*   (2013.01)
*G06F 21/84*   (2013.01)

(52) U.S. Cl.
CPC ............ *G06F 21/575* (2013.01); *G06F 21/84* (2013.01); *G06F 2221/2105* (2013.01); *G06F 2221/2153* (2013.01)

(58) Field of Classification Search
CPC ........ G06F 21/575; G06F 21/72; G06F 21/51; G06F 21/57; G06F 12/1408; G06F 9/4403; G06F 21/34
(Continued)

(56) References Cited

U.S. PATENT DOCUMENTS 5,937,063 A    8/1999  Davis
6,141,756 A   10/2000  Bright et al.
(Continued)

FOREIGN PATENT DOCUMENTS

CN   102063034 A    5/2011
EP      1659472      5/2006
(Continued)

OTHER PUBLICATIONS

US 2010/0122095 A1, 05/2010, Jones et al. (withdrawn)
(Continued)

*Primary Examiner* — Thomas Lee
*Assistant Examiner* — Santosh R Poudel
(74) *Attorney, Agent, or Firm* — Staas & Halsey LLP

(57) ABSTRACT

A system on chip is provided. The system on chip includes a first memory to store a plurality of encryption keys, a second memory, a third memory to store an encryption key setting value, and a CPU to decrypt encrypted data which is stored in an external non-volatile memory using an encryption key corresponding to the encryption key setting value from among the plurality of encryption keys, to store the decrypted data in the second memory, and to perform a boot using data stored in the second memory. Accordingly, security of a boot operation can be improved.

21 Claims, 31 Drawing Sheets

Related U.S. Application Data

(60) Provisional application No. 61/734,158, filed on Dec. 6, 2012.

(58) Field of Classification Search
USPC .................................................. 713/2
See application file for complete search history.

(56) References Cited

U.S. PATENT DOCUMENTS

| | | | |
|---|---|---|---|
| 7,143,278 B2 | 11/2006 | Angelo et al. | |
| 7,590,862 B2 | 9/2009 | Erny et al. | |
| 7,610,426 B1 | 10/2009 | Dunn | |
| 7,934,049 B2 | 4/2011 | Holtzman et al. | |
| 8,069,477 B2 | 11/2011 | Lee et al. | |
| 8,069,478 B2 | 11/2011 | Cho et al. | |
| 8,176,549 B2 | 5/2012 | Lee et al. | |
| 8,291,226 B2 | 10/2012 | Chun et al. | |
| 8,330,966 B2 | 12/2012 | Lee et al. | |
| 8,332,934 B2 | 12/2012 | Lee et al. | |
| 8,386,781 B2 | 2/2013 | Cho et al. | |
| 8,443,203 B2 | 5/2013 | Park et al. | |
| 8,453,260 B2 | 5/2013 | Lee et al. | |
| 8,773,681 B2* | 7/2014 | Kamasuka | G06F 3/1222 358/1.14 |
| 9,203,980 B2 | 12/2015 | Lee et al. | |
| 2005/0005078 A1 | 1/2005 | Vu et al. | |
| 2005/0091522 A1* | 4/2005 | Hearn | G06F 21/575 726/26 |
| 2005/0182952 A1* | 8/2005 | Shinozaki | G06F 21/575 713/189 |
| 2006/0015748 A1 | 1/2006 | Goto et al. | |
| 2006/0090084 A1 | 4/2006 | Buer | |
| 2006/0112266 A1 | 5/2006 | Little et al. | |
| 2006/0179302 A1* | 8/2006 | Hatakeyama | G06F 21/51 713/164 |
| 2007/0083491 A1 | 4/2007 | Walmsley et al. | |
| 2007/0136593 A1* | 6/2007 | Plavcan | G06F 21/34 713/172 |
| 2007/0192531 A1* | 8/2007 | Suzuki | G06F 12/1425 711/103 |
| 2007/0198856 A1 | 8/2007 | Lee et al. | |
| 2007/0283140 A1* | 12/2007 | Jones | G06F 9/4403 713/2 |
| 2007/0288761 A1 | 12/2007 | Dale et al. | |
| 2008/0082759 A1 | 4/2008 | Pong | |
| 2008/0091930 A1 | 4/2008 | Conti et al. | |
| 2008/0168266 A1 | 7/2008 | Sita et al. | |
| 2008/0294838 A1 | 11/2008 | Houston et al. | |
| 2009/0019275 A1 | 1/2009 | Park et al. | |
| 2009/0144559 A1 | 6/2009 | Lee et al. | |
| 2009/0172420 A1 | 7/2009 | Zayas | |
| 2009/0204823 A1 | 8/2009 | Giordano et al. | |
| 2009/0219559 A1 | 9/2009 | Lee et al. | |
| 2009/0220077 A1 | 9/2009 | Lee et al. | |
| 2009/0222653 A1 | 9/2009 | Findeisen et al. | |
| 2009/0222664 A1 | 9/2009 | Cho et al. | |
| 2009/0222886 A1 | 9/2009 | Lee et al. | |
| 2009/0262940 A1* | 10/2009 | Lim | G06F 12/1408 380/277 |
| 2009/0288160 A1* | 11/2009 | Esliger | G06F 21/575 726/17 |
| 2010/0005264 A1* | 1/2010 | Ito | G06F 21/74 711/163 |
| 2010/0017656 A1 | 1/2010 | Park et al. | |
| 2010/0017659 A1 | 1/2010 | Dos Remedios | |
| 2010/0182818 A1 | 7/2010 | Ito | |
| 2010/0189262 A1 | 7/2010 | Ducharme et al. | |
| 2010/0253966 A1 | 10/2010 | Walmsley et al. | |
| 2011/0002002 A1 | 1/2011 | Lee et al. | |
| 2011/0004746 A1 | 1/2011 | Lee et al. | |
| 2011/0004768 A1 | 1/2011 | Cho et al. | |
| 2011/0047376 A1 | 2/2011 | Mittal | |
| 2011/0113173 A1 | 5/2011 | Hays et al. | |
| 2011/0225409 A1 | 9/2011 | Sibert et al. | |
| 2012/0084438 A1* | 4/2012 | Raleigh | H04L 41/046 709/224 |
| 2013/0070301 A1 | 3/2013 | Lee et al. | |
| 2013/0111605 A1 | 5/2013 | Maeda et al. | |
| 2014/0164725 A1 | 6/2014 | Jang et al. | |

FOREIGN PATENT DOCUMENTS

| | | |
|---|---|---|
| EP | 2 226 810 A1 | 9/2010 |
| EP | 2250602 | 11/2010 |
| KR | 1020060004584 | 1/2006 |
| KR | 1020060055058 | 5/2006 |
| KR | 20090007123 | 1/2009 |
| KR | 20090037712 | 4/2009 |
| KR | 20090093661 | 9/2009 |
| KR | 20100125371 | 11/2010 |
| KR | 10-1049647 | 7/2011 |

OTHER PUBLICATIONS

International Search Report dated Oct. 17, 2013 issued in International Application No. PCT/KR2013/005128.
Written Opinion of the International Searching Authority dated Oct. 17, 2013 issued in International Application No. PCT/KR2013/005128.
Partial European Search Report dated Mar. 13, 2014 issued in EP Application No. 13195128.7.
International Search Report dated Mar. 14, 2014 issued in International Application No. PCT/KR2013/010403.
Written Opinion of the International Searching Authority dated Mar. 14, 2014 issued in International Application No. PCT/KR2013/010403.
Arm Limited: "Arm Security Technology-Building a Secure System using TrustZone Technology", Internet Citation, Apr. 30, 2009 (Apr. 30, 2009), pp. I-XII, 1, XP002660015, Retrieved from the Internet: URL:http://infocenter.arm.com/help/topic/com.arm.doc.prd29-genc-009492c/PRD29-GENC-009492C_trustzone_security_whitepaper.pdf [retrieved on Sep. 27, 2011] *sections 3.4, 5.2.1, and 5.2.2*.
Extended European Search Report dated Jul. 11, 2014 issued in EP Application No. 13195128.7.
Examination Report mailed Feb. 19, 2016 in Australian Patent Application No. 2013355576.
European Office Action dated Jul. 1, 2016 in corresponding European Patent Application No. 13861166.0.
European Office Action dated Oct. 4, 2016 in corresponding European Patent Application No. 13 195 128.7.
Extended European Search Report dated Nov. 17, 2016 in corresponding European Patent Application No. 13861166.0.
European Office Action dated Dec. 5, 2016 in corresponding European Patent Application No. 13 861 166.0.
Russian Office Action dated Nov. 22, 2016 in corresponding Russian Patent Application No. 2015126874/08.
Chinese Office Action dated Feb. 20, 2017 in corresponding Chinese Patent Application No. 201380064091.9, 9 pages.
Office Action dated Jul. 15, 2015 in related U.S. Appl. No. 13/848,864.

* cited by examiner

SYSTEM ON CHIP TO PERFORM A SECURE BOOT, AN IMAGE FORMING APPARATUS USING THE SAME, AND METHOD THEREOF

CROSS-REFERENCE TO RELATED APPLICATIONS

This application is a continuation in part of U.S patent application Ser. No. 13/848,864, filed on Mar. 22, 2013, which claims the benefit under 35 U.S.C. §119 from U.S. Provisional Application No. 61/734,158, filed on Dec. 6, 2012, which claims foreign priority benefit of Korean Patent Application No. 10-2013-0029218, filed on Mar. 19, 2013, the disclosures of which are incorporated herein by reference in its entirety.

BACKGROUND OF THE INVENTION

1. Field of the Invention

Methods and apparatuses of the exemplary embodiments of the present general inventive concept relate to a system on chip, an image forming apparatus using the same, and a method thereof, and more particularly, to a system on chip which performs secure boot using encrypted data, an image forming apparatus using the same, and a method thereof.

2. Description of the Related Art

With the development of electronic technologies, various kinds of electronic products have been developed. In particular, as computers come into wide use, computer peripherals are increasingly being used. The computer peripheral refers to an apparatus that improves utilization of a computer. Printers, scanners, copiers, and multi-function peripherals are the representative examples of such computer peripherals.

An image forming apparatus refers to an apparatus that performs an image forming job, that is, forms an image on paper or other media. In order to perform the image forming job, developer such as ink or toner may be used. The image forming apparatus that uses a laser method using toner may include a charging unit, a developing unit, a transfer unit, a laser scanning unit, and a fusing unit. Such units which are consumed as the job is performed, including the above units, may be referred to as consumable units. If the consumable unit is used for a predetermined time, its characteristic may be changed and thus good printing quality is not expected. In particular, a toner cartridge which contains toner should be replaced with new one when the toner is exhausted. Therefore, product manufacturers sell consumable units separately from complete products in case such a situation arises.

In recent years, the consumable unit may have a memory embedded therein to exactly determine when the consumable unit should be replaced. A variety of information on use of the consumable unit may be stored in the memory. However, there is a problem that it is easy for an unauthorized person to access the memory embedded in the consumable unit. Accordingly, information stored in the memory may be changed and thus it may be difficult to use and manage the consumable unit. Therefore, there has been an attempt to reinforce security of the memory of the consumable unit.

However, the unauthorized person may hack into the apparatus communicating with the consumable unit rather than the memory. In particular, an expedient to hack security technology applied to the consumable unit by changing a boot process of a main memory embedded in a body of the apparatus may be developed.

SUMMARY OF THE INVENTION

Accordingly, there is a demand for a method of improving security of a boot process. One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments of the present general inventive concept provide a system on chip which performs secure boot using a non-volatile memory in which encrypted data is stored, an image forming apparatus having the same, and a method thereof.

Additional features and utilities of the present general inventive concept will be set forth in part in the description which follows and, in part, will be obvious from the description, or may be learned by practice of the general inventive concept.

According to an exemplary embodiment of the present general inventive concept, there is provided a system on chip including a first memory to store a plurality of decryption keys, a second memory, a third memory to store an encryption key setting value, and a Central Processing Unit (CPU) to decrypt encrypted data which is stored in an external non-volatile memory using a decryption key corresponding to the encryption key setting value from among the plurality of decryption keys, to store the decrypted data in the second memory, and to perform a boot using data stored in the second memory.

Initialization data may be stored in the first memory separately from the plurality of decryption keys, and the CPU may perform initialization using the initialization data and may decrypt the encrypted data.

The system on chip may further include a first circuit to restrict access to CPU via an external port for a predetermined time.

When power is switched on, the first circuit may output a disable signal to disable the access to the CPU, and, when at least the decryption and authentication of the decrypted data is completed, the first circuit may output an enable signal to enable the access to the CPU.

The first circuit may include a first register, and, when the decryption and authentication of the decrypted data is completed, the CPU may change a storage value of the first register.

The system on chip may include a second circuit and a third circuit to control access to the first memory.

The second circuit may include a second register, and the third circuit may include a third register. When the decryption and authentication of the decrypted data is completed, the CPU may store a control value to disable access to the first memory in the second register, and may store a control value to change the access to the first memory to access to the second memory in the third register.

The CPU may execute an infinite loop when the decryption fails.

When power is switched on, the CPU may identify a memory that is designated by a setting value stored in the third memory or an external pin, and, when the first memory is designated, the CPU may perform secure boot using the encrypted data, and, when the second memory is designated, the CPU may perform normal boot using non-encrypted data which is stored in the non volatile memory.

The first memory may be a mask Read Only Memory (ROM) or a one-time programmable (OTP) ROM, and the second memory may be a static random access memory (SRAM). The third memory may be an electrical fuse (EFUSE) memory.

The system on chip may include a memory controller communicatively coupled to the CPU, including at least one switch to select a connection state with the external memory, where the memory controller selectively outputs a writing signal received from the CPU to the external memory according to a result of a comparison between a first key value and a second key value.

The system on chip may include where the memory controller controls the at least one switch to select the connection state so as to output the writing signal to the external memory when the first key value and the second key value are the same.

The system on chip may include where the memory controller controls the at least one switch so as to disable the connection to the external memory so as to prevent the writing signal from being output to the external memory.

The system on chip may include where the memory controller controls a read operation of the external memory even when the memory controller is preventing the writing signal from being output to the external memory.

The system on chip may include where the at least one switch includes a first switch and a second switch, with the memory controller to control the first switch so as to control a read operation of the external memory, and the second switch to control a connection with the second switch so as to control the output of the writing signal to the external memory.

The system on chip may include that when a first key value and a pre-stored second key value are different from one another, the memory controller blocks a writing operation to the external non volatile memory.

Exemplary embodiments of the present general inventive concept may also provide an image forming apparatus including a consumable unit in which a Customer Replaceable Unit Monitoring (CRUM) chip is mounted, and a controller to perform an image forming job using the consumable unit and to update data recorded on the CRUM chip according to the image forming job. The controller may include a non-volatile memory to record encrypted data, and a system on chip to perform a secure boot using the encrypted data when the image forming apparatus is turned on, and to control the image forming apparatus according to a user command when the secure boot is completed.

The system on chip may include a first memory to store a plurality of decryption keys, a second memory, a third memory to store an encryption key setting value, and a CPU to decrypt data stored in the non-volatile memory using a decryption key corresponding to the encryption key setting value from among the plurality of decryption keys, to store the decrypted data in the second memory, and to perform boot using data stored in the second memory.

Initialization data may be stored in the first memory separately from the plurality of decryption keys, and the CPU may perform initialization using the initialization data and then may decrypt the encrypted data.

When a boot event has occurred, the system on chip may restrict access to CPU via an external port for a predetermined time.

The system on chip may further include a first circuit which, when the image forming apparatus is turned on, outputs a disable signal to disable the access to CPU, and, when at least the decryption and authentication of the decrypted data is completed, outputs an enable signal to enable the access to CPU.

The first circuit may include a first register, and, when the at least the decryption and authentication of the decrypted data is completed, the CPU may change a storage value of the first register.

When the at least the decryption and authentication of the decrypted data is completed, the CPU may perform a register setting job to disable access to the first memory and change the access to the first memory to access to the second memory.

When the image forming apparatus is turned on, the CPU may identify a memory that is designated by a setting value stored in the third memory or an external pin, and when the first memory is designated, the CPU may perform secure boot using the encrypted data, and, when the second memory is designated, the CPU may perform normal boot using non-encrypted data which is stored in the external non-volatile memory.

The first memory may be a mask ROM or an OTP ROM, and the second memory may be an SRAM. The third memory may be an EFUSE memory.

Exemplary embodiments of the present general inventive concept also provide a method of booting of an image forming apparatus including a non-volatile memory and a system on chip, the method including initializing using initialization data which is stored in a first memory of the system on chip, when the initializing is performed, decrypting encrypted data which is stored in the non-volatile memory using one of a plurality of decryption keys which are stored in the first memory, storing the decrypted data in a second memory of the system on chip and performing a boot using data which is stored in the second memory.

The method may further include when the image forming apparatus is turned on, identifying a memory that is designated according to an input value input through a third memory of the system on chip or an external pin, and, when the designated memory is the first memory, disabling access to a CPU of the system on chip.

The method may further include, when at least decryption and authentication of the decrypted data is completed, enabling the access to the CPU.

The method may include when the at least decryption and authentication of the decrypted data is completed, disabling the access to the first memory, and performing register setting to change the access to the first memory to access to the second memory.

Exemplary embodiments of the present general inventive concept may also provide an electronic device having a memory device, and a system on chip including a central processing unit (CPU), and a memory controller communicatively coupled to the CPU and the memory device, the memory controller to selectively output a writing signal received from the CPU to the memory device according to a result of a comparison between a first key value and a second key value.

The electronic device may include where the memory controller controls at least one switch to select a connection state so as to output the writing signal to the memory device when the first key value and the second key value are the same.

The electronic device may include where the memory controller controls the at least one switch so as to disable the connection to the memory device so as to prevent the writing signal from being output to the memory device.

The electronic device may include where the memory controller controls a read operation of the memory device even when the memory controller is preventing the writing signal from being output to the memory device.

Exemplary embodiments of the present general inventive concept may also provide a host device including a storage to store a plurality of cipher texts corresponding to each of a plurality of versions, a communication unit to receive a cipher text stored in an image forming apparatus when a predetermined event occurs, a controller to control the image forming apparatus to be in a waiting state for printing when a cipher text corresponding to the firmware version of the image forming apparatus is the same as the received cipher text, and when the cipher text and the firmware version are different from each other, the controller blocks the use of the image forming apparatus.

According to the above-described exemplary embodiments, security of a boot process can be improved and thus damage caused by malicious hacking by an unauthorized person can be minimized and/or prevented.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
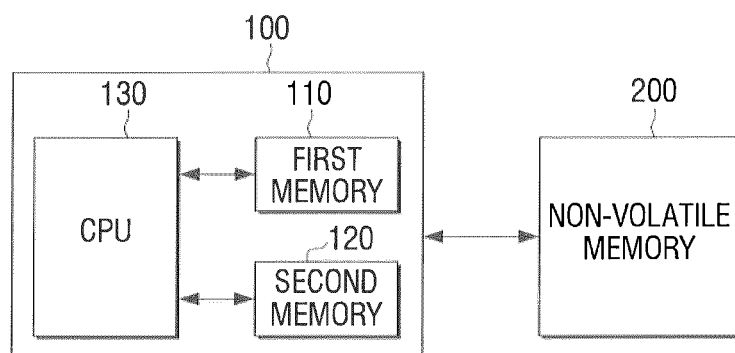
FIG. 1 is a block diagram illustrating a system on chip according to an exemplary embodiment of the present general inventive concept.

Hereinafter, exemplary embodiments will be described in greater detail with reference to the accompanying drawings.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

It is common that an electronic apparatus performs a boot process to normally operate when it is turned on. The electronic apparatus performs initialization, and loads and executes a program through the boot process. The boot process that determines the initial state of the electronic apparatus may affect an operating parameter (e.g., an important operating parameter) of the electronic apparatus and thus may practically affect the electronic apparatus when it is used. Therefore, if the boot process is accessible such that anyone can change it, there is a risk that a program that a user does not intend may be loaded. That is, a hacker may be able to change a boot process so as to load a program that a hacker intends, but that a user does not request to load. Therefore, there is a demand for a method of safely booting so that a boot process cannot be changed arbitrarily, that is, a secure boot method. To achieve secure boot, boot data may be stored in a non-volatile memory of the electronic apparatus in an encrypted state. A system on chip 100 controls the operation of the electronic apparatus accesses the non-volatile memory, decrypts the encrypted data, and performs a secure boot process. Hereinafter, a system on chip and a secure boot method thereof according to various exemplary embodiments of the present general inventive concept will be explained.

FIG. 1 is a block diagram illustrating a system on chip according to an exemplary embodiment of the present general inventive concept. Referring to FIG. 1, a system on chip 100 performs a secure boot using a non-volatile memory 200 in which encrypted data is stored. The system on chip 100 and the non-volatile memory 200 of FIG. 1 may be embedded in an electronic apparatus (e.g., a single electronic apparatus). For example, the system on chip may 100 may be embedded in an image forming apparatus, such as an image forming apparatus 1000 illustrated and described in connection with FIG. 10. The system on chip 100 may be embedded in any suitable electronic device. The system on chip may be an integrated circuit, a programmable logic device, a field programmable gate array, and/or any suitable device to carry out a secure boot according to the exemplary embodiments of the present general inventive concept disclosed herein.

The system on chip 100 performs a boot process using the encrypted data which is stored in the non-volatile memory 200. Specifically, various data such as a boot block started symbol (BSS), a kernel, an initialization program, an operating system (OS), the other OS (wireless stack), an engine, emulation, a fixed segment, a heap, an authentication key, an encrypted OS, and a device driver may be encrypted and stored in the non-volatile memory 200.

The data may be encrypted in various methods. For example, a data encryption standard (DES) method, a triple DES (TDES) method, an advanced encryption standard (AES) method, a SEED algorithm, a Rivest Shamir Adleman (RSA) method, and an academy-research institute-agency (ARIA) algorithm may be used.

The DES method refers to a method that encrypts and decrypts data using a symmetric key encryption algorithm using a key of 56 bits. The TDES method refers to a method that repeats the DES three times. The AES method refers to a method that encrypts decrypts a block of a size of 128 bits using a key of any multiple of 32 bits such as 128, 160, 192, 224, or 256 bits. The SEED method, which is similar to the AES method, refers to a 128-bit block encryption method that encrypts and decrypts data using a decryption key of 128 bits or 256 bits. The RSA method is a kind of public key encryption system that uses a one-way function, and the ARIA algorithm is a block encryption method that encrypts and decrypts a block of 128 bits using a key of 128, 192, or 256 bits.

Various data that are encrypted in various encryption methods described above may be stored in the non-volatile memory 200. The stored data or the encryption method may be selectively applied according to a characteristic of a product in which the system on chip 100 and the non-volatile memory 200 of FIG. 1 are mounted, or other environmental conditions.

Referring to FIG. 1, the system on chip 100 includes a first memory 110, a second memory 120, and a central processing unit (CPU) 130. The CPU 130 may be a processor and/or any suitable device to carry out the exemplary embodiments of the present general inventive concept. A decryption key may be stored in the first memory 110. The first memory 110 may be implemented by using a mask read only memory (ROM) or a one time programmable (OTP) memory.

The mask ROM is a memory that memorizes data in advance at the manufacturing time and does not allow the user to modify the data. The OTP memory may be used in in-system programming, but is a kind of programmable ROM that does not allow data to be modified once it is programmed.

The decryption key is a key to decrypt the data which is stored in the non-volatile memory 200, in particular, a boot code. The non-volatile memory 200 may store data that is encrypted in one of the above-described methods, and a decryption key corresponding to the encrypted data may be stored in the first memory 110.

The first memory 110 may store information on a boot loader. The boot loader refers to a program that is executed in advance before an OS starts, finishes all operations necessary for starting a kernel, and finally starts the OS. That is, the OS is divided into a kernel in which real commands are driven, a framework which transmits commands included in a program to the kernel, and a user interface (UI) which is driven on the kernel and the framework. The boot loader refers to a program that prepares hardware prior to staring the kernel. Specifically, private boot loader information may be stored in the first memory 110. The private boot loader information may include information necessary for initializing the system.

The second memory 120 is an internal memory that is used to perform a boot operation. The second memory 120 may be a SRAM which does not require initialization. However, this should not be considered as limiting, and the second memory 120 may be any suitable memory to carry out the exemplary embodiments of the present general inventive concept as disclosed herein.

The CPU 130 decrypts encrypted data which is stored in the non-volatile memory 200 located outside the system on chip 100, using a decryption key stored in the first memory 110, and stores the decrypted data in the second memory 120. The CPU 130 may perform boot using the data stored in the second memory 120. The decryption method may correspond to the data encryption method.

For example, if the AES method is applied, the data is encrypted by repeating an AddRoundKey process which performs XOR operation with respect to the data to be encrypted and an initially input cipher key, an SubBytes process which substitutes a result of the XOR operation according to a specific rule, a ShiftRows process which shifts a data row, and a MixColumn process which mixes the data row 10 times. The non-volatile memory 200 may store data that is encrypted in the above-described method. The CPU 130 may decrypt the encrypted data by repeating reverse processes corresponding to the above-described encryption processes. The decrypted data is stored in the second memory 120 and the CPU 130 performs a subsequent boot process using the stored data.

If the RSA method is applied, the data is encrypted and decrypted using a public key {N, E} and a private key {N, D}. Specifically, two great prime numbers 'p' and 'q' (i.e., prime numbers greater than a predetermined amount) are selected and Modulus N=p*q and PI(N) are calculated. Also, E is arbitrarily selected so that E is relatively prime to PI(N)=(p−a)(q−1). D, which has a relationship of E*D mod PI(N)−1, is calculated using an extended Euclidean algorithm. As a result, RSA encryption may be performed using the public key {N, E} and the private key {N, D}. The RSA encryption may be performed using equation E(M)=M^E mod N=C. M denotes data to be encrypted. The non-volatile memory 200 may store a boot code that is encrypted according to this equation. In this case, the CPU 130 may perform RSA decryption using equation D(C)=C^D mod N=((M^E)^D) mod N=M. The decrypted data is stored in the second memory 120 and the CPU 130 performs a subsequent boot process using the stored data.

According to the above-described method, the system on chip 100 loads the data stored in the external memory 200 thereinto in the encrypted state, decrypts the data and performs a boot operation. Accordingly, even if an unauthorized person hacks data exchanged between the external memory 200 and the system on chip 100, the boot process cannot be changed and boot security can be improved.

Figure 2:
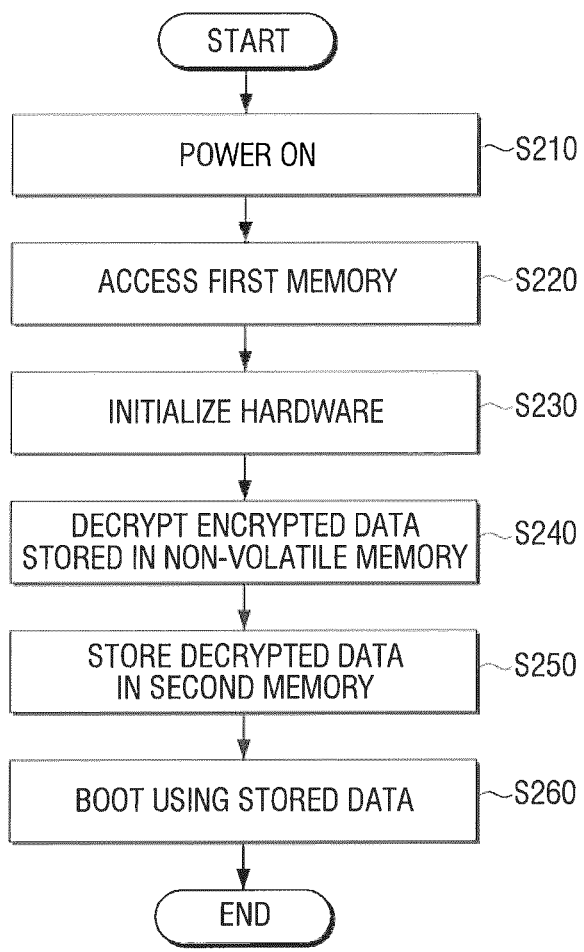
FIG. 2 is a flowchart illustrating a secure boot method according to an exemplary embodiment of the present general inventive concept.

FIG. 2 is a flowchart illustrating a secure boot method in detail according to an exemplary embodiment of the present general inventive concept. Referring to FIG. 2, if the electronic apparatus in which the system on chip (e.g., system on chip 100) is mounted is turned on in operation S210, the system on chip accesses the first memory 110 and reads data stored in the first memory 110 in operation S220. Specifically, the CPU 130 goes to a reset vector to which a specific address is allocated and fetches an instruction. In the present exemplary embodiment, the address of the reset vector may be designated as the first memory 110.

If the first memory 110 is designated, the CPU 130 performs a secure boot using the data stored in the first memory 110. The first memory 110 may store various data such as a code to initialize the system (e.g., system on chip 100) and a code or a decryption key to decrypt an encrypted external program code.

The CPU 130 detects the code to initialize the system from the first memory 110 and performs an initializing job with respect to hardware of the electronic apparatus at operation S230. The initializing job may include advancing a clock used in the system on chip 110 using an internal phase lock loop (PLL) circuit or initializing a double data rate (DDR) controller to use a DDR memory. The initializing job may further include various initializing operations such as initially driving various applications, initializing a set up to form a communication channel with internal or external apparatuses of the electronic apparatus, initializing a memory value, setting an internal register value, input/output (I/O) setting, serial setting, obtaining a MAC address, and Ethernet port setting. The initializing job may include preparing another hardware mounted in the electronic apparatus along with the system on chip 100. Such initializing operations may be implemented in various ways according to a kind of the electronic apparatus in which the system on chip 100 is mounted. The code stored in the first memory 110 may be used for other operations. For example, data CPU 130 reads a boot option pin setting (SPI/NAND/SD) value, and leads (i.e., writes) data into the second memory 120 according to the corresponding boot option.

The CPU 130 decrypts the encrypted data which is loaded into the system on chip 100 at operation S240. The CPU 130 may decrypt the data using a decryption key stored in the first memory 110. The CPU 130 stores the decrypted data in the second memory 120 or the DDR memory at operation S250. The CPU 130 performs boot using the decrypted data at operation S260.

That is, the CPU 130 may perform boot using data such as a decrypted boot block started symbol (BSS), a kernel code, an initialization program, an OS, the other OS (wireless stack), an engine, emulation, a fixed segment, and a heap. The boot refers to operations of loading a kernel, executing a framework, executing a UI, and starting an OS.

According to the exemplary embodiment described above, a secure boot can be performed using the first memory 110 and the second memory 120 of the system on chip 100, which are not encrypted, where the encrypted data is stored in the external non-volatile memory 200.

Figure 3:
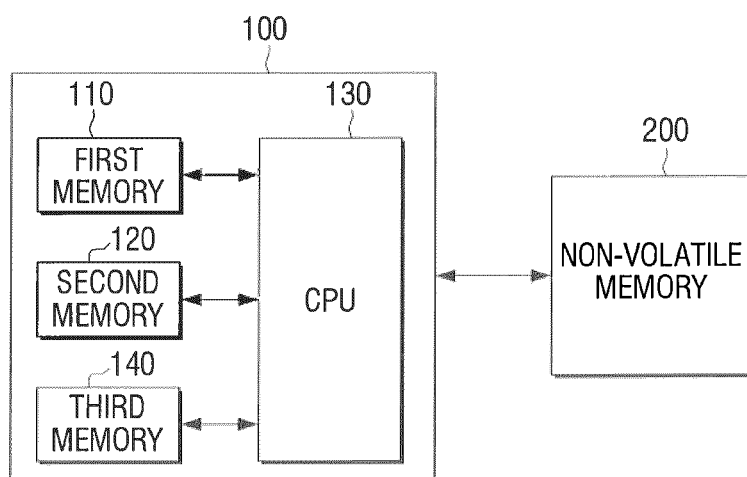
FIG. 3 is a block diagram illustrating a system on chip according to an exemplary embodiment of the present general inventive concept.

FIG. 3 is a block diagram illustrating a system on chip according to an exemplary embodiment of the present general inventive concept. Referring to FIG. 3, the system on chip 100 may include a third memory 140 in addition to the first memory 110, the second memory 120, and the CPU 130.

According to an exemplary embodiment of the present general inventive concept, a plurality of decryption keys may be stored in the first memory 110. A setting value to select one of the plurality of decryption keys may be stored in the third memory 140. Such a setting value is referred to as an encryption key setting value. The third memory 140 may be an electrical fuse (EFUSE) memory which is a kind of OPT memory. However, this should not be considered as limiting, and the third memory 140 may be any suitable memory in order to carry out the exemplary embodiments of the present general inventive concept as disclosed herein.

The CPU 130 determines which of the plurality of decryption keys stored in the first memory 110 will be selected according to the setting value (that is, an encryption key setting value) stored in the third memory 140. If a key in use is exposed, the manufacturer of the system on chip 100 or the electronic apparatus in which the system on chip 100 is mounted changes the key by changing the encryption key setting value of the third memory 140.

According to the present exemplary embodiment, even if one decryption key is exposed, there is no need to replace the whole system on chip and the CPU 130 may deal with this problem by changing the setting value programmed in the third memory 140.

The other operations of the second memory 120 and the CPU 130 are the same as described in the above first exemplary embodiment and thus a redundant explanation is omitted.

Figure 4:
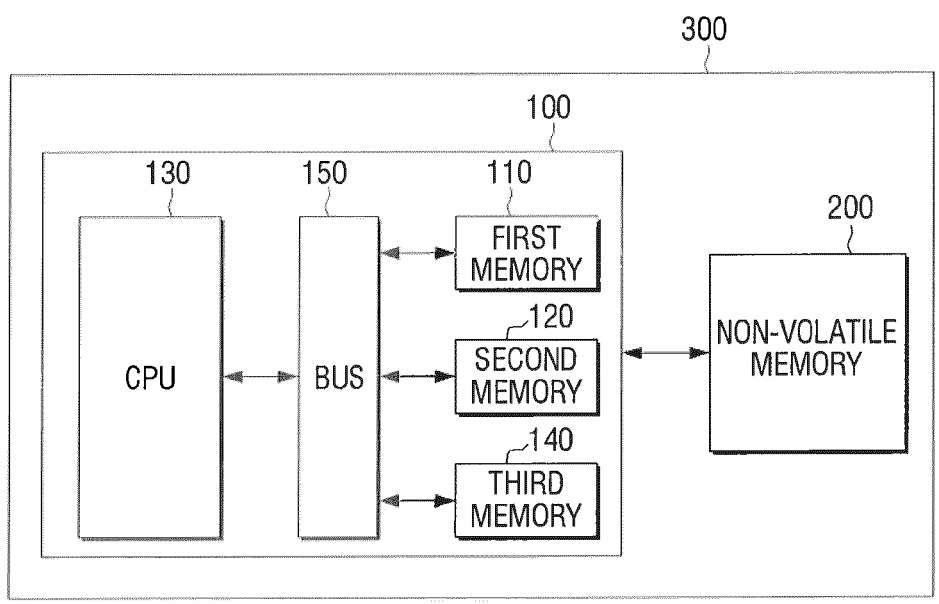
FIG. 4 is a block diagram illustrating a main board on which a system on chip is mounted according to an exemplary embodiment of the present general inventive concept.

FIG. 4 is a block diagram illustrating a main board 300 on which the system on chip 100 and the non-volatile memory 200 are mounted. The main board 300 may be disposed, for example, in an electronic apparatus. Referring to FIG. 4, the system on chip 100 and the non-volatile memory 200 may be mounted on the single main board 300. Besides the system on chip 100 and the non-volatile memory 200, various parts (e.g., hardware components of the electronic apparatus, such as, for example, a communications interface, a user interface, an image processor, an image sensor, an audio processor, etc.) may be mounted on the main board 300, but are not illustrated for the convenience of explanation.

The system on chip 100 includes the first memory 110, the second memory 120, the CPU 130, the third memory 140, and a bus 150. Referring to FIG. 4, the CPU 130 may be connected to various elements including the first to third memories 110, 120, and 140 through the bus 150. The bus 150 may include various kinds of buses, such as an address bus, a data bus, and a control bus.

The system on chip 100 illustrated in FIGS. 3 and 4 may appropriately select an encryption method using the third memory 140 (e.g., DES, TDES, SEED, RSA, ARIA, etc.).

Figure 5:
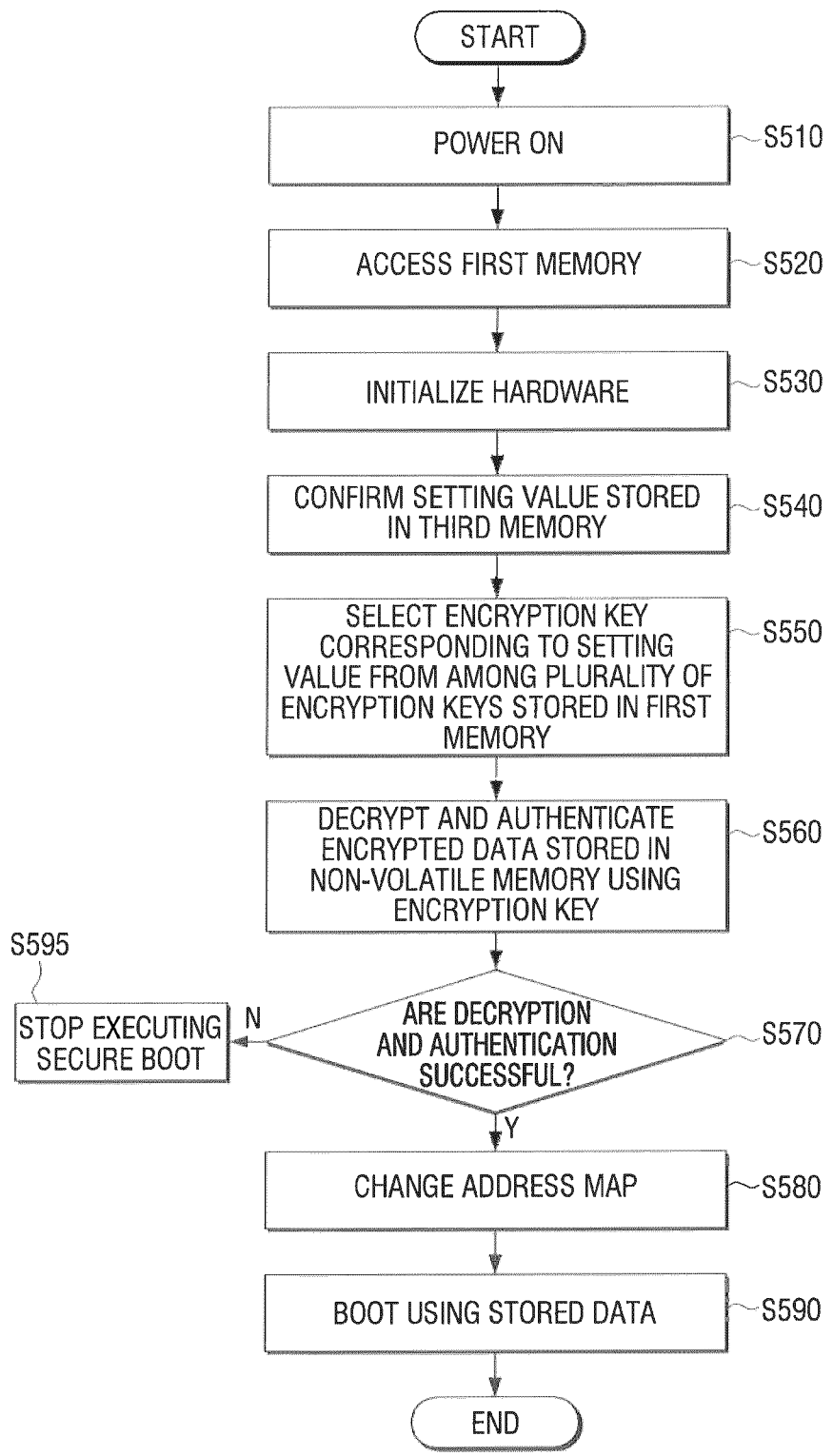
FIG. 5 is a flowchart illustrating a secure boot method according to an exemplary embodiment of the present general inventive concept.

FIG. 5 is a flowchart illustrating a secure boot method of the system on chip illustrated in FIG. 3 or 4. Referring to FIG. 5, if the electronic apparatus in which the system on chip 100 is mounted is turned on at operation S510, the CPU 130 of the system on chip 100 accesses the first memory 110 at operation S520 and identifies initialization data. The access to the first memory 110 may be performed according to an instruction that is fetched from a reset vector. The CPU 130 initializes hardware (e.g., hardware components of the electronic apparatus, such as one or more memory devices, a communications interface, etc.) according to the identified initialization data at operation S530. An example of the initializing operation has been described above with reference to FIG. 2 and a redundant explanation is omitted. The CPU 130 may prohibit access to itself through an external port while a secure boot is performed.

If initialization is completed, the CPU 130 identifies a setting value which is stored in the third memory 140 at operation S540, and selects a decryption key corresponding to the setting value from among the plurality of decryption keys stored in the first memory 110 at operation S550. If the decryption key is selected, the CPU 130 decrypts encrypted data which is stored in the non-volatile memory 200 using the decryption key and performs authentication at operation S560. The decrypted data is copied into the second memory 120 or the DDR memory.

As described above, the data is decrypted according to various encryption algorithms such as a DES method, a TDES method, an AES method, a SEED algorithm, an RSA method and an ARIA method.

The authentication is a process of verifying effectiveness of an authentication code of the data. To achieve the authentication, an authentication algorithm such as HMAC-SHA256, HMAC-SHA1, and HMAC-MD5, and/or any suitable authentication algorithm to carry out the exemplary embodiment of the present general inventive concept may be used. These algorithms are key-based algorithms that share a single secret key. In particular, the HMAC is defined in RFC 204 (keyed-hashing for a message authentication code). The decryption key value for decrypting and the key value for authenticating may be stored in the first memory 110 as described above.

If the authentication code is not effective or decryption fails at operation S570, the CPU 130 stops executing the secure booting program and/or falls in an infinite loop at operation S595.

If the decryption and the authentication succeed, and all system preparations are completed, the CPU 130 changes an address map at operation S580. Accordingly, when there is an attempt to access the first memory 110, the access is forcedly changed to access to the second memory 120.

The CPU 130 performs a boot using the decrypted data which is copied into the second memory 120 at operation S590. The boot process has been described above and thus a redundant explanation is omitted.

In the above exemplary embodiment, the system on chip which performs a secure boot and the operations thereof have been described. However, according to an exemplary embodiment, the secure boot or a normal boot may be selectively performed according to an environment in which the system on chip is used.

Figure 6:
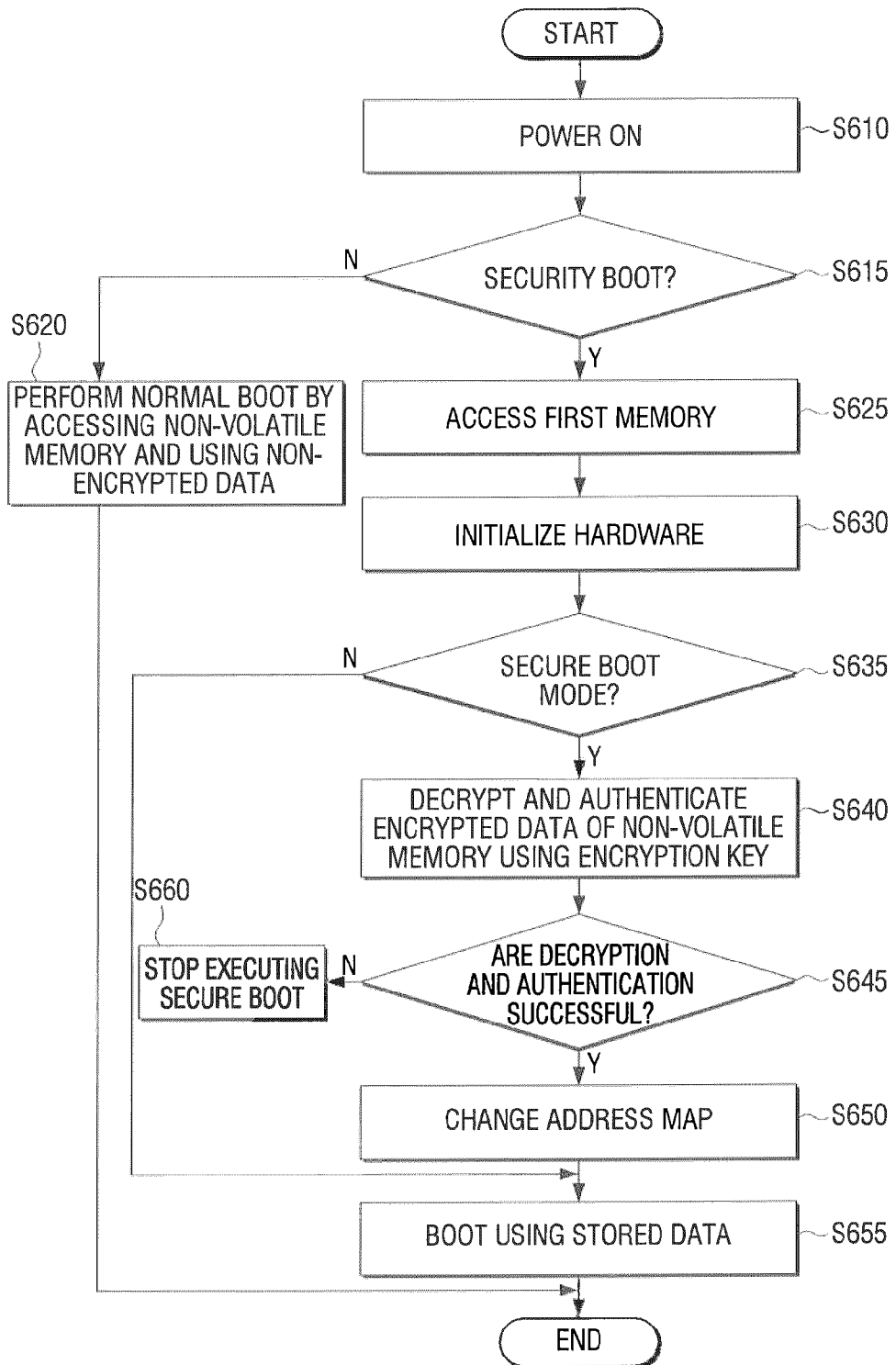
FIG. 6 is a flowchart to illustrate a secure boot method according to an exemplary embodiment of the present general inventive concept.

FIG. 6 is a flowchart illustrating a boot method of a system on chip according to an exemplary embodiment of the present general inventive concept. According to the exemplary embodiment, the non-volatile memory 200 may store encrypted data and non-encrypted data together.

In this state, if the electronic apparatus is turned on at operation S610, the CPU 130 determines whether to perform secure boot or normal boot at operation S615. That is, if power is switched on, the CPU 130 goes to a reset vector and fetches an instruction. The first memory 110 or the second memory 120 may be designated as the reset vector. That is, the first memory 110 and the second memory 120 are mapped onto the same address (for example, 0xffff0000) via the bus 150. If the CPU 130 identifies the address 0xffff0000 from the reset vector, the CPU 130 accesses one of the first memory 110 and the second memory 120 that is designated. The memory may be designated by a designation value which is input through an external pin connected to the CPU 130 or a designation value which is stored in the third memory 140.

If the second memory 120 is designated, it is determined that a normal boot rather than a secure boot is performed at operation S615: N. In this case, the CPU 130 accesses the non-volatile memory 200 and performs the normal boot using the non-encrypted data.

If the first memory 110 is designated, it is determined that secure boot is performed at operation S615: Y. If the secure boot is performed, the CPU 130 accesses the first memory 110 at operation S625 and detects initialization data at operation S630. Prior to this, the CPU 130 may prohibit access to itself via an external port.

The CPU 130 initializes basic hardware using the initialization data at operation S630. The CPU 130 loads encrypted data which is stored in the non-volatile memory 200 into the second memory 120.

The CPU 130 determines whether a secure boot mode is set or not at operation S635. That is, the CPU 130 may determine whether to perform a secure boot regardless of whether the first memory 110 is designated or not using the external pin (or a first external pin) or the third memory 140. For example, even if non-encrypted data is stored in the non-volatile memory 200, the CPU 130 may perform a boot using the first memory 110. In this case, decryption is omitted. It is determined whether the mode is a secure boot mode or not based on another designation value stored in the third memory 140 or another external pin (hereinafter, a second external pin).

If secure boot mode is set, the CPU 130 performs decryption and authentication using a decryption key which is stored in the first memory 110 at operation S640. The decryption and the authentication may be performed according to the above-described various algorithms (e.g., DES, TDES, AES, SEED, RSA, ARIA, etc.).

If at least one of the decryption and the authentication fails at operation S645: N, the CPU 130 falls in an infinite loop at operation S660. That is, the CPU 130 stops executing the secure boot mode. If the decryption and the authentication succeed at operation S645: Y, the CPU 130 changes the address map at operation S650. The CPU 130 may control the second memory 120 to be used instead of the first memory 110. Accordingly, it is impossible to access the code stored in the first memory 110 after the address map is changed. At this time, it is impossible to trace a code and a key value with a JTAG and the address is set to be read 0xffff when being accessed.

When the address map is changed, the CPU 130 jumps to the data copied into the second memory 120 (for example, a first boot loader) and performs a boot operation using this data at operation S655. The first boot loader refers to a boot loader to load a second boot loader into the memory. The core functions of the boot loader to provide a UI and load a kernel are performed by the second boot loader. The boot loader may be divided into the first and second boot loaders considering an insufficient space.

As described above, the system on chip 100 may be implemented in various forms and perform secure boot. The above described exemplary embodiments can be changed in combination with at least one of other exemplary embodiments. The figures and descriptions related to these exemplary embodiments are omitted.

Figure 7:
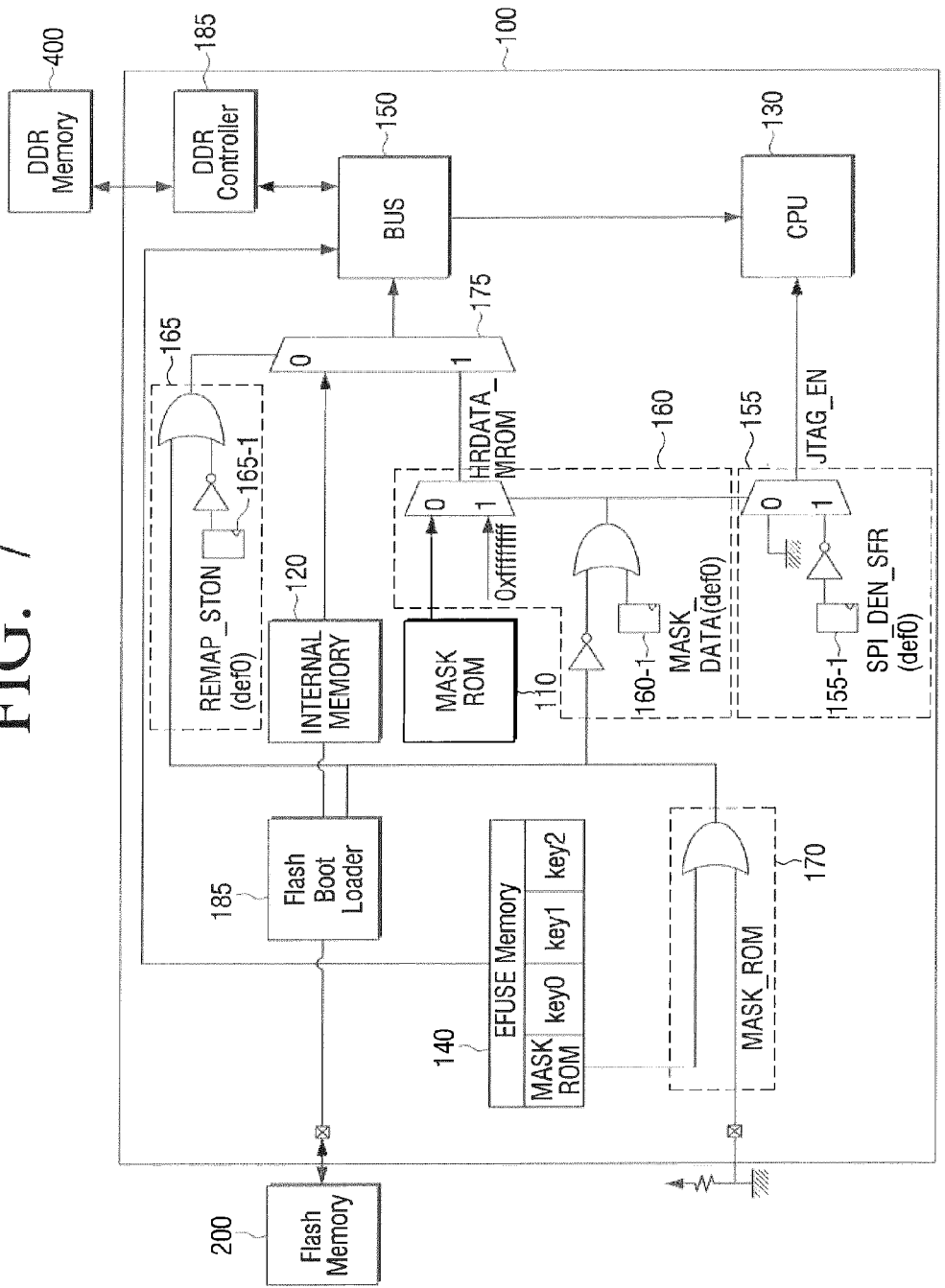
FIG. 7 is a circuit diagram illustrating an example of the system on chip of FIG. 4 in detail.

FIG. 7 is a view illustrating an example of a system on chip in detail. Referring to FIG. 7, the system on chip 100 may include a DDR controller 185 and various circuits 155, 160, 165, 170, 175, and 180 in addition to the first memory 110, the second memory 120, the CPU 130, the third memory 140, and the bus 150. In FIG. 7, the first memory 110 is implemented by using a mask ROM and the second memory 120 is implemented by using an SRAM. The third memory 140 is implemented by using an EFUSE memory. The third memory 140 may store a setting value (keys 1, 2, and 3) for selecting a decryption key and a designation value (mask ROM) for setting whether to perform secure boot.

Each of the circuits 155, 160, 165, 170, 175, and 180 may be, for example, a register, a logic circuit, and a multiplexer. The first circuit 155 includes a first register 155-1. The CPU 130 may control access to CPU through an external port using the first circuit 155. Specifically, the first circuit 155 inputs a JTAG_EN signal corresponding to a value registered at the first register 155-1 to the CPU 130.

That is, if a boot event is generated, the fourth circuit 170 outputs a result of an OR operation performed with respect a value which is input through an external pin and a designation value which is input through the third memory 140. The boot event includes an event in which the system on chip 100 or the apparatus (e.g., the electronic apparatus) in which the system on chip is mounted is turned on. If secure boot is to be performed, a '1' may be recorded on the third memory 140. Accordingly, the fourth circuit 170 outputs '1'. The output value of the fourth circuit 170 is input to the second circuit 160 and the third circuit 165.

The second circuit 160 and the third circuit 165 include second and third registers 160-1 and 165-1, respectively, to control the access to the first memory 110. The output value '1' of the fourth circuit 170 to be input to the second circuit 160 is inverted. Accordingly, '0' is input to the second circuit 160. The second circuit 160 outputs a value of OR operation performed with respect to the input value '0' and a storage value of the second register 160-1 using an OR gate. Since '0' may be recorded on the second register 160-1 in an initial state, the second circuit 160 eventually outputs '0' to the first circuit 155.

The first circuit 155 includes the first register 155-1. The first circuit 155 includes a multiplexer to selectively output a value stored in the first register 155-1 or an external value. If '0' is input from the second circuit 160, the first circuit 155 outputs a signal to disable the access to CPU to the CPU 130. Accordingly, the access to CPU through an external port may be restricted for a predetermined time, that is, a time during which secure boot is performed after an apparatus with the SOC 100 is turned on.

If the apparatus is turned on, the CPU 130 identifies a memory that is designated according to a setting value stored in the third memory 140 or an input value input through an external pin. If the designated memory is the first memory 110, the CPU 130 stores a first value (for example, '1') to disable the access to CPU in the first register 155-1.

If system preparation (e.g., at least the decryption and authentication of the decrypted data) is completed, the CPU 130 stores a second value (for example, '0') to enable the access to CPU in the first register 155-1. The storage value of the second register 160-1 of the second circuit 160 may also be changed.

Specifically, if system preparation is completed, the CPU 130 records a control value (for example, '1') to disable the access to the first memory 110 on the second register 160-1, and blocks data of all regions of the first memory 110 from being read out. If the storage value of the second register 160-1 is changed to '1', the output value of the second circuit 160 is changed to '1'.

The CPU 130 records a control value (for example, '1') to change the access to the first memory 110 to the access to the second memory 120 on the third register 165-1. In this case, the access to the first memory 110 is automatically changed to the access to the second memory 120 when the CPU 130 accesses the first memory 110. Since a decrypted code is copied into the second memory 120 in advance, the CPU 130 may use the same.

The fourth circuit 170 may include an OR gate to provide a designation value which is input through an external pin or the third memory 140. The CPU 130 may determine whether to perform secure boot or not according to the designation value which is input through the fourth circuit 170.

A multiplexer 175 selectively inputs a value output from the second memory 120 or the second circuit 160 to the bus 150.

A flash boot loader 185 refers to a flash memory for storing a boot loader. The flash boot loader 185 loads a private boot loader stored in the non-volatile memory 200 when normal boot is performed. The CPU 130 performs normal boot using the flash boot loader 185.

The DDR controller 185 is a controller that controls data reading/writing (R/W) on an external DDR memory 400. As described above, the system on chip 100 may be implemented in various forms and may be used along with the non-volatile memory 200 and the DDR memory 300. The detailed configuration of a system on chip 100 is not limited to that which is illustrated in FIG. 7, and can be embodied as other various forms. Another exemplary embodiment of a system on chip 100 will be explained in detail with reference to the accompanying drawings.

Figure 8:
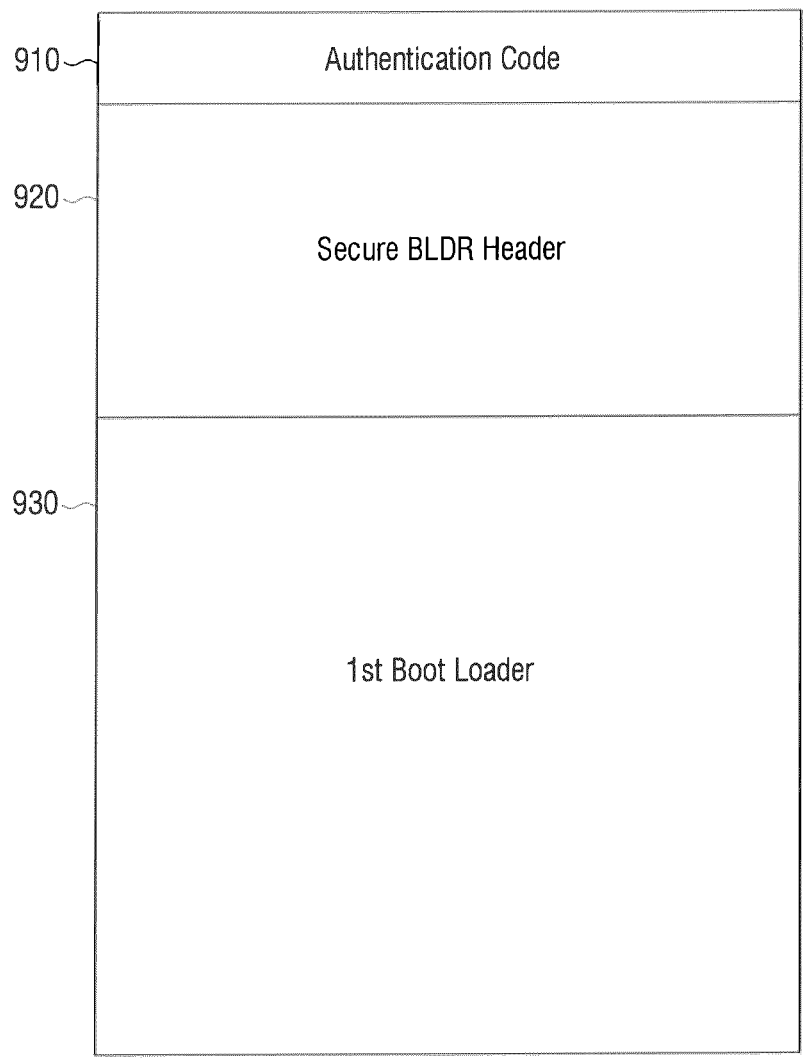
FIG. 8 is a view illustrating an example of a layout of a secure firmware.

FIG. 8 is a view illustrating an example of a layout of data which is stored in the first memory 110. Referring to FIG. 8, the first memory 110 stores an authentication code 910, a secure boot loader header 920, and a first boot loader 930.

The authentication code 910 may be encrypted and stored according to various encryption algorithms (e.g., DES, TDES, AES, SEED, RSA, ARIA, etc.). For example, the authentication code 910 may be encrypted (e.g., encrypted using an encryption method such as DES, TDES, AES, SEED, RSA, ARIA, etc.) and stored according to an authentication algorithm such as HMAC-SHA256, HMAC-SHA1, and HMAC-MD5 as described above.

The secure boot loader header 920 may include electronic signature information, an offset value, a size, weather information, and a user ID. The secure boot loader header 920 may be encrypted and stored in one of various encryption algorithms such as a DES method, a TDES method, an AES method, a SEED algorithm, an RSA method, and an ARIA algorithm.

The first boot loader 930 may be encrypted and stored in an encrypted state for the sake of internal security.

In FIG. 8, the boot loader 930 may be set to start according to a plurality of NOP (i.e., no operation) instructions for the sake of internal security.

Figure 9:
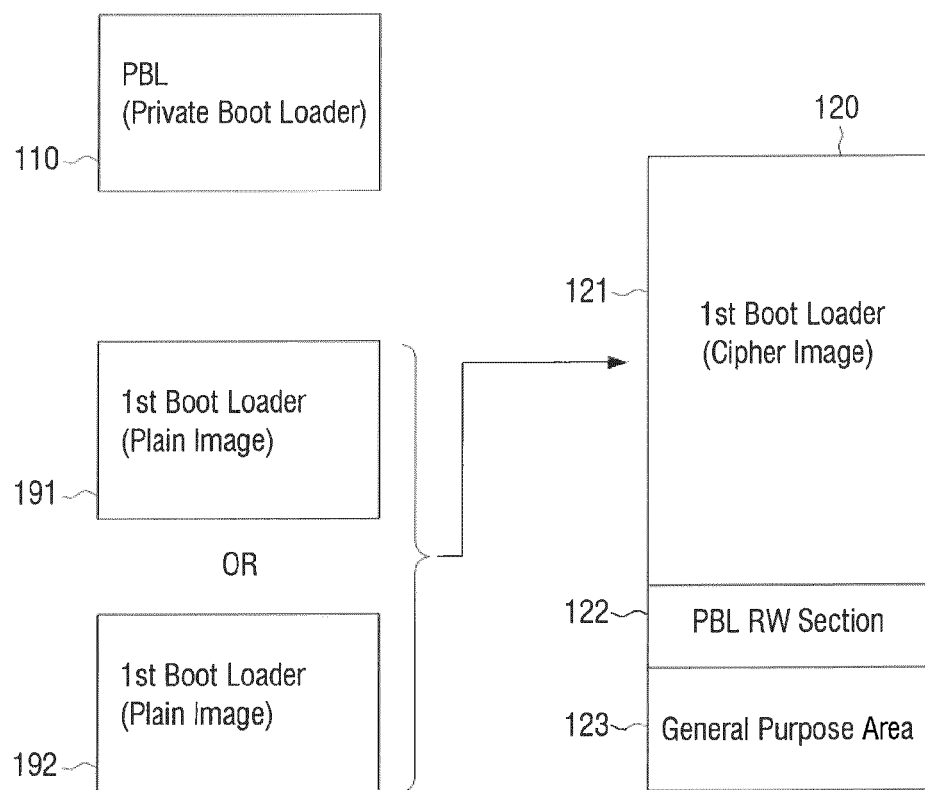
FIG. 9 is a view illustrating an example of a memory map to perform secure boot.

FIG. 9 is a view illustrating an example of a memory map 940 of the system on chip 100. Referring to FIG. 9, a private boot loader is stored in a specific address of the first memory 110. The private boot loader may be used for normal boot.

If secure boot is performed, the CPU 130 may load the first boot loader stored in the non-volatile memory 200 into a region 191 of a register (of the second memory 120) or a specific region 192 of the second memory 120. The CPU 130 decrypts the first boot loader using a decryption key and copies the decrypted first boot loader into a specific region 121 of the second memory 120. The second memory 120 may be provided with one or more regions such as an RW section 122 to read/write that data may be read from or written to, and a general-purpose region 123.

As described above, the system on chip 100 may process the encrypted data of the external non-volatile memory 200 using various internal memories.

The manufacturer of the electronic apparatus or a service provider who uses the electronic apparatus may wish to safely store his/her own secret key in the electronic apparatus. The secret key may be used for various purposes. For example, the secret key may be used in encrypting some or all of the regions of the kernel or creating a safe communication channel between the electronic apparatus and the manufacturer or between the electronic apparatus and the service provider. The first memory 110 or the third memory 140 of the system on chip 100 may be implemented by using an OTP memory and may store the above-described secret key.

The system on chip 100 according to the above-described various exemplary embodiments may be used in various kinds of electronic apparatuses. For example, the system on chip may be used in an image forming apparatus such as a printer, a multifunction peripheral, a facsimile machine, or a scanner.

According to an exemplary embodiment, an image forming apparatus may include a variety of consumable units (e.g., a paper feeder, a charging unit, a laser scanning unit, a developing unit, a transfer unit, a fusing unit, a paper discharge unit, a scanning unit, and a scan motor) and a controller. The controller performs an image forming job using the consumable units. If a CRUM (Customer Replaceable Unit Monitoring) chip is mounted in the consumable unit, the controller may update data which is recorded on the CRUM chip according to the image forming job.

The controller may include a non-volatile memory (e.g., non-volatile memory 200) and a system on chip (e.g., the system on chip 100). The non-volatile memory may record encrypted data thereon. If the image forming apparatus is turned on, the system on chip performs secure boot using the encrypted data which is stored in the non-volatile memory, and, if the secure boot is completed, controls the image forming apparatus according to a user command.

Figure 10:
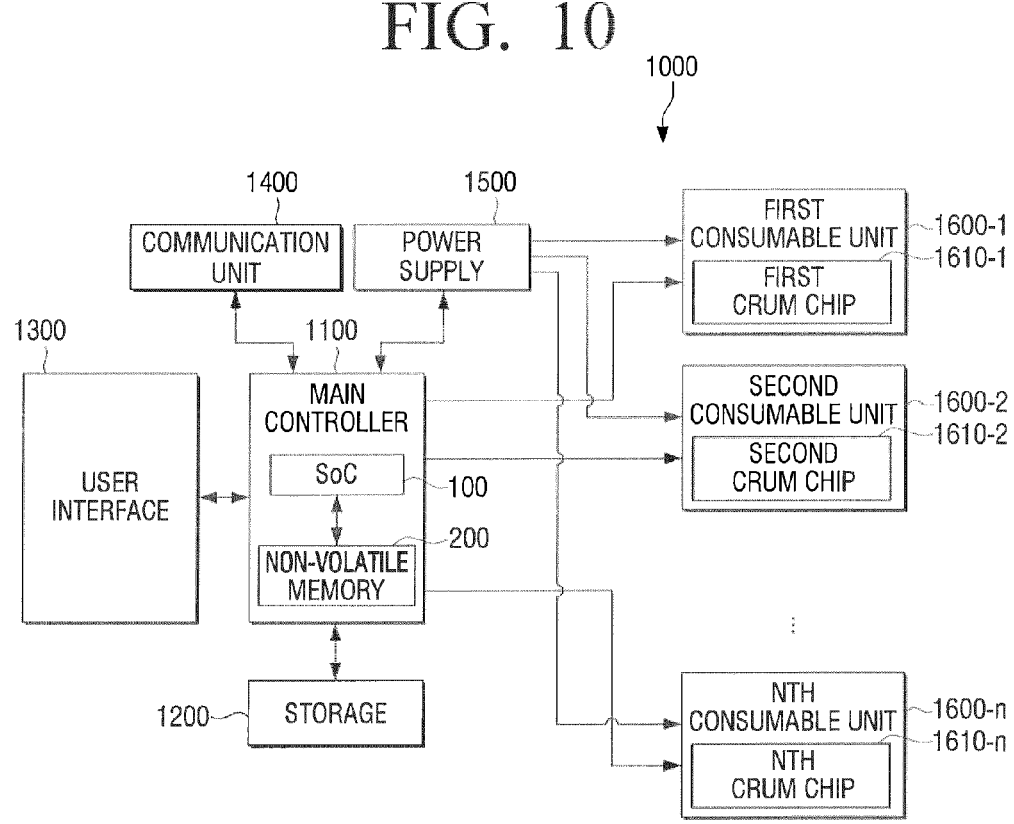
FIG. 10 is a block diagram illustrating an example of an image forming apparatus in which a system on chip is mounted.

FIG. 10 is a block diagram illustrating an example of an image forming apparatus. Referring to FIG. 10, an image forming apparatus 1000 includes a controller 1100, a storage 1200, a user interface 1300, a communication unit 1400, a power supply 1500, and a plurality of consumable units 1600-1 to 1600-n.

The storage 1200 may include a hard disk drive (HDD) or other storages (e.g., a solid state drive (SSD), a memory device, etc.). The storage 1200 is not necessarily implemented by using an internal memory and may be implemented by using an external memory which is removably mounted on the image forming apparatus 1000.

The user interface 1300 can receive various selection commands from the user. The user interface 1300 may include a display panel and at least one button. In this case, the display panel may be implemented by using a touch screen. The at least one button may be implemented as part of the touch screen. The user interface 1300 may provide various UI screens, and the user may input various user commands by directly touching the UI screen or manipulating the button of the user interface 1300.

The communication unit 1400 may be connected to an external device through a network or a local area network (LAN) and may receive data and commands. That is, the communication unit 1400 may be connected to a host PC (personal computer) through a local interface or may be connected to a plurality of external devices in a wired or wireless manner through a network. IEEE of U.S., 802.11 standard, hyper LAN standard of Europe, or MMAC-PC standard of Japan may be used as a wireless communication standard. Besides these, various communication methods such as Wi-Fi, Bluetooth, Zigbee, or near field frequency communication (NFC) may be used for communication.

The power supply 1500 supplies power to each of the elements of the image forming apparatus 1000 (e.g., the controller 1100 and the plurality of consumable units 1600-1 to 1600-n). Specifically, the power supply 1500 receives common AC power from an external source (AC_IN), converts it into DC power of an electric potential appropriate to each element using elements such as a transformer, an inverter, and a rectifier, and outputs the DC power (DC_OUT).

The controller 1100 includes a system on chip 100 and a non-volatile memory 200. Accordingly, if the image forming apparatus 1000 is turned on, the controller 1100 performs secure boot. The secure boot may be performed in various methods as described above (e.g., as described above in connection with FIGS. 5-6). The system on chip 100 which performs secure boot and the operations thereof have been described above and thus a redundant explanation is omitted.

If boot is completed, the controller 1100 controls an overall operation of the image forming apparatus according to data and a command of an external device which is connected to the image forming apparatus through the communication unit 1400, or a user selection command which is input through the user interface 1300.

Specifically, if a print command is executed in a printer driver which is installed in a host PC or an application, the printer driver of the host PC generates print data by converting a corresponding document in a predetermined printer language. The controller 1100 receives such print data through the communication unit 1400. The controller 1100 converts the print data into a bitmap image comprised of "0" and "1" using a halftone table, and controls the plurality of consumable units 1600-1 to 1600-n to print the bitmap image on paper.

Various kinds of consumable units 1600-1 to 1600-n may be provided according to a kind of the image forming apparatus 100. If the image forming apparatus is a laser multifunction peripheral, the consumable units 1600-1 to 1600-n may be a paper feeder, a charging unit, a laser scanning unit, a developing unit, a transfer unit, a fusing unit, a paper discharge unit, a scanning unit, and a scan motor. At least some of the consumable units 1600-1 to 1600-n may include CRUM chips 1610-1 to 1610-n.

The CRUM chips 1610-1 to 1610-*n* may be implemented by using only memories, or may be implemented by include a memory and a CPU. The CRUM chips 1610-1 to 1610-*n* may have an OS (operating system) separately from the controller 1100, and may perform initialization by themselves using the OS. The CRUM chips 1610-1 to 1610-*n* perform authentication with respect to the controller 1100, and, if authentication succeeds, can perform encryption data communication. The CRUM chips 1610-1 to 1610-*n* may be implemented in various forms.

Figure 11:
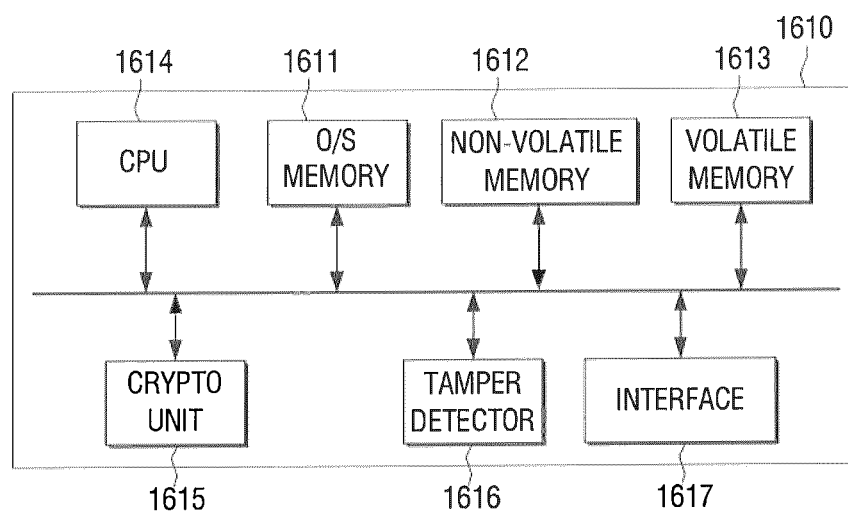
FIG. 11 is a block diagram illustrating an example of a CRUM chip which is mountable in a consumable unit.

FIG. 11 is a block diagram illustrating an example of a CRUM chip in detail. Referring to FIG. 11, a CRUM chip 1610 includes an OS memory 1611, a non-volatile memory 1612, a volatile memory 1613, a CPU 1614, a cryptography (crypto) unit 1615, a tamper detector 1616, and an interface 1617. Although not illustrated, the CRUM chip 1610 may include a clock unit to output a clock signal and a random value generator to generate a random value for authentication. However, some of the elements may be deleted and may be included in another element. The crypto unit 1615 may be an integrated circuit, a processor, a field programmable gate array, a programmable logic unit, and/or any suitable device to perform cryptography (e.g., encrypt data and/or decrypt data) according to exemplary embodiments of the present general inventive concept disclosed herein. The tamper detector 1616 may be an integrated circuit, a sensor, a processor, a field programmable gate array, a programmable logic unit, and/or any suitable device to detect tampering with a consumable unit (e.g., first consumable unit 1600-1, second consumable unit 1600-2, etc.) according to exemplary embodiments of the present general inventive concept as disclosed herein. The interface 1617 may be any suitable communications interface to transmit data to and receive data from, for example the main controller 1100 (e.g., as illustrated in FIG. 10) that includes the system on chip 100.

The OS memory 1611 stores an operating system (OS) to drive the consumable unit 1600-1 to 1600-*n*. The non-volatile memory 1612 may store one or more data and programs regarding the consumable unit (e.g., any of the consumable units 1600-1 to 1600-*n*) and the CRUM chip (e.g., any one or more of first CRUM chip 1610-1 to 1610-*n*). Specifically, the non-volatile memory 1612 may store electronic signature information, one or more encryption program codes, state information of the consumable units (for example, toner remaining information, replacement time information, a number of copies remaining to be printed), unique information (for example, manufacturer information, manufacturing date information, a serial number, a product model name), and after service information. The CPU 1614 may load the program and the data which are stored in the non-volatile memory 1612 into the volatile memory 1613, and may use them.

The crypto unit 1615 supports an encryption algorithm and may cause the CPU 1614 to perform authentication with respect to the controller 1100 provided in the image forming apparatus or to perform encrypted communication (e.g., via the interface 1617). Specifically, the crypto unit 1615 may perform authentication or encryption data communication using the above-described various encryption algorithms.

The tamper detector 1616 is to protect and/or prevent various physical hacking attempts. That is, the tamper detector 1616 detects and protects a consumable unit (e.g., any of the consumable units 1600-1 to 1600-*n*) from tampering. Specifically, the tamper detector 1616 monitors an operating environment such as voltage, temperature, pressure, light, and frequency, and, if there is an attempt such as Decap (i.e., decapsulating the CRUM chip 1610 to determine how it operates) or any other tampering activity, the tamper detector 1616 deletes or physically blocks the data (e.g., the data stored in the volatile memory 1613, the non-volatile memory 1612, and/or the O/S memory 1611). In this case, the tamper detector 1616 may include separate power supply.

By providing the crypto unit 1615 and the tamper detector 1616 as described above, systematic data security using both hardware and software is possible.

The interface 1617 connects the CPU 1614 and the controller 1100 each other via a wired and/or wireless communications link. Specifically, the interface 1617 may be implemented by using a serial interface, or a wired and/or a wireless interface.

As described above, the system on chip 100 may be mounted in the image forming apparatus and may perform a secure boot. Accordingly, the system on chip can minimize and/or prevent an unauthorized person from changing the boot process or hacking the data of the consumable unit (e.g., any of the consumable units 1600-1 to 1600-*n*). The system on chip 100 may be mounted and used in various electronic apparatuses besides the image forming apparatus.

As described above, a system on chip 100 uses a first memory 110 initially, and subsequently performs an operation using a second memory 120. Important information, such as various data related to initialization, a decryption key to decrypt codes, and boot codes, etc. can be stored in the first memory 110. Thus, when using the first memory 110 is completed, it is necessary to minimize and/or prevent data of the first memory 110 from being changed, or data of the first memory 110 from being leaked by disabling access to the first memory 110. For this, as described in connection with FIG. 7, a second circuit 160 and a third circuit 165 can be prepared additionally within the system on chip 100. However, the configuration of the system on chip 110 is not limited to this, and various modifications can be applied.

Figure 12:
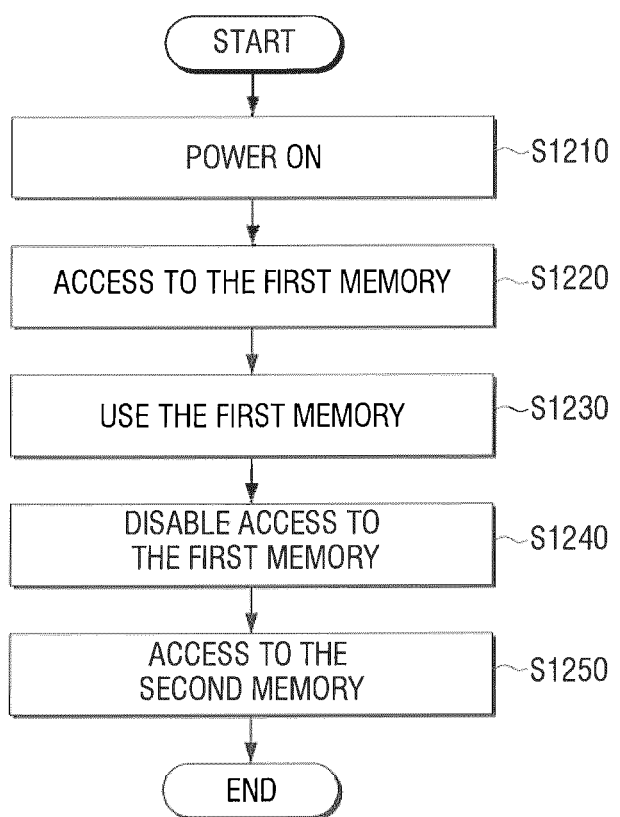
FIG. 12 is a flowchart illustrating a method of using a memory of a system on chip according to an exemplary embodiment of the present general inventive concept.

FIG. 12 is a flowchart illustrating a method of using a memory in a system on chip according to an exemplary embodiment of the present general inventive concept. According to FIG. 12, when a power of an image forming apparatus is turned on at operation S1210, the CPU 130 accesses the first memory 110 at operation S1220. Accordingly, the CPU 130 performs various operations by using a program and data which are stored in the first memory at operation S1230. For example, when initialization data is stored in the first memory 110, the CPU 130 performs initializing an image forming apparatus by using the initialization data. When initialization is completed, the CPU 130 reads encrypted data in the non-volatile memory 200, and decrypts the data by using a decryption key stored in the first memory 110. The CPU 130 stores the decrypted data in the second memory 120.

A boot operation is performed by using the second memory 120, and not by using the first memory 110. Thus, the CPU 130 does not need to use the first memory 110 anymore. Therefore, the CPU 130 disables access to the first memory 110 at operation S1240. The CPU 130 performs the next operation by accessing to the second memory 120 at operation S1250.

Since decryption operation and boot operation are described specifically in the various exemplary embodiments as shown above, repetitive descriptions are omitted.

Figure 13:
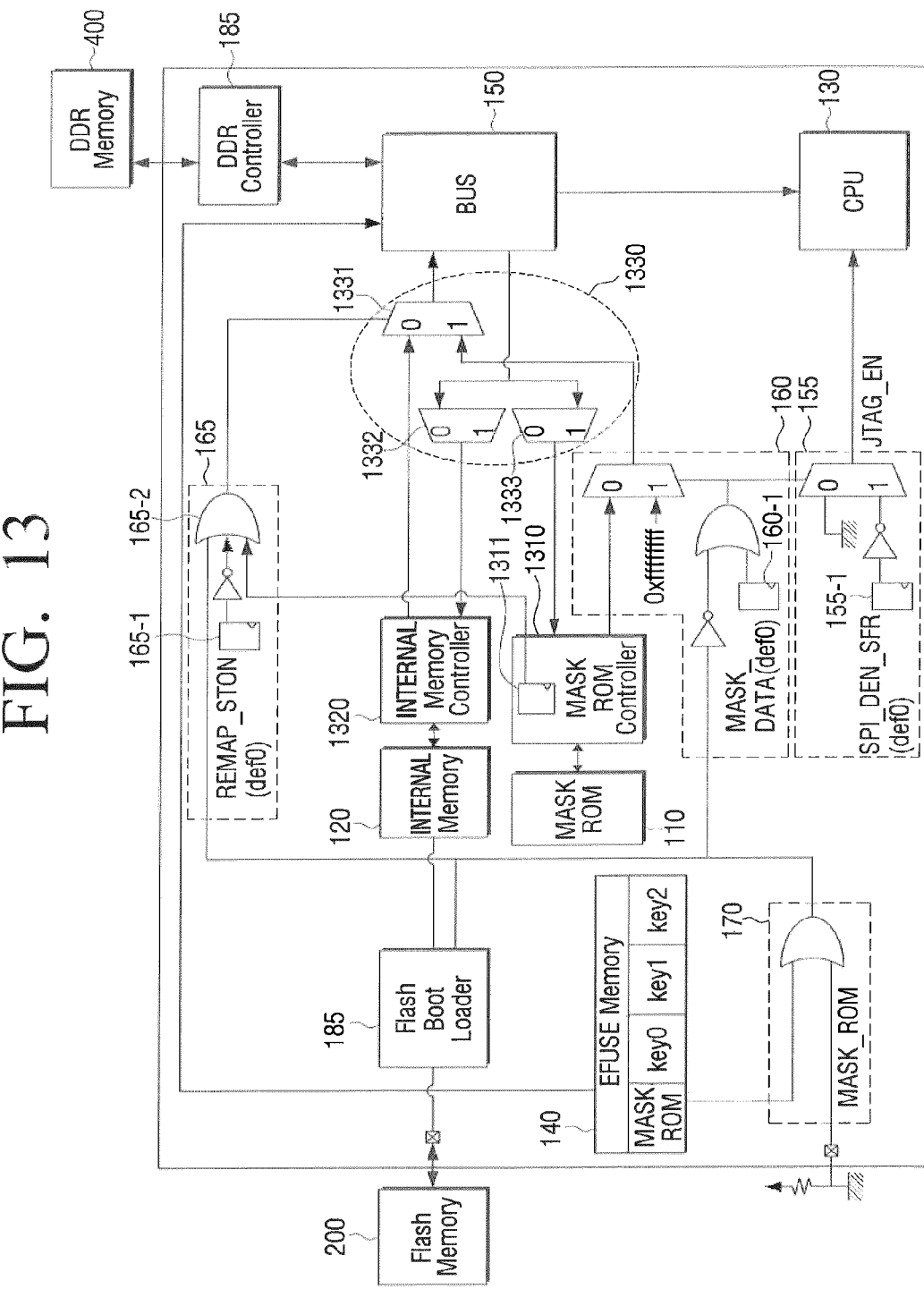
FIG. 13 is a block diagram illustrating an example of a system on chip according to the exemplary embodiment of the present general inventive concept of FIG. 12.

FIG. 13 is a view illustrating an exemplary embodiment of the present general inventive concept of the system on chip. As illustrated in FIG. 13, the system on chip 100 may include a first memory controller 1310, a second memory controller 1320, and a switching unit 1330. The system on the chip 100 may include the first memory 110, the second memory 120, the CPU 130, a third memory 140, a bus 150, a DDR controller 185, and circuits 155, 160, 165, 170, 175, and 180. Other elements besides the first memory controller 1310, the second memory controller 1320, and the switching unit 1330 are described specifically in connection with FIG. 7 above, and thus, repetitive descriptions are omitted.

The first memory controller 1310 is an element and/or device to control access to the first memory 110. The first memory controller 1310 may be an integrated circuit, processor, programmable logic device, field programmable gate array, and/or any suitable device to control access to the first memory 110 according to exemplary embodiments of the present general inventive concept. When a reading signal is received from the CPU 130, the first memory controller 1310 reads data in an area designated by the reading signal within the first memory 110, and outputs the data to the CPU 130. The second memory controller 1320 can control access to the second memory 120. The second memory controller 1320 can perform reading and writing, as the same as the first memory controller 1310. The second memory controller 1320 may be an integrated circuit, processor, programmable logic device, field programmable gate array, and/or any suitable device to control access to the first memory 110 according to exemplary embodiments of the present general inventive concept.

The switching unit 1330 is an element and/or electronic device to connect one of the first memory controller 1310 and the second memory controller 1320 with the bus 150 selectively. That is, as described above, the CPU 130 uses the first memory 110 until data of a non-volatile memory 200 is decrypted after the apparatus (e.g., an image forming apparatus, an electronic apparatus, etc.) is turned on, and thereafter, the CPU 130 uses the second memory 120. The switching unit 1330 connects the first memory controller 1310 with the bus 150 when the CPU 130 is in an operation state to use the first memory 110, and connects the second memory controller 1320 with the bus 150 when using the first memory 110 is completed.

As illustrated in FIG. 13, the first memory controller 1310 includes a register 1311. An access control value on the first memory 110 is stored in the register 1311. The access control value is a value to enable or disable access to the first memory 110. The access control value can include one or more bit values.

As illustrated in FIG. 13, the data in the register 1311 embedded in the first memory controller 1310 is input to a third circuit 165. Unlike the exemplary embodiment of the present general inventive concept illustrated in FIG. 7, the third circuit 165 does not include an inverter and a QR gate. Instead, the third circuit 165 may include an AND gate 165-2. The AND gate 165-2 outputs '1' when all of a storage values stored in the third register 165-1, a storage value stored in the register 1311, and an output value output from a fourth circuit 170 are '1'. Thus, when the CPU 130 stores an access control value, which has a value of '0' in the register 1311, the third circuit 165 outputs '0' regardless of a storage value stored in the third register 165-1 and an output value output from the fourth circuit 170.

When the system on chip 100 is turned on and/or receives power from a power supply, an access control value, for example '1', is stored in the register 1311. Thus, the third circuit 160 outputs '1' to the switching unit 1330. The switching unit 1330 includes a first multiplexer 1331, a second multiplexer 1332, and a third multiplexer 1333. The first multiplexer 1331 outputs selectively one of the values which are output from the first memory controller 1310 and the second memory controller 1320 to the bus 150 according to a value which is output from a third circuit 160. FIG. 13 illustrates a circuit structure where when '1' is output from the third circuit 165, a value which is output from the first memory controller 1310 is transmitted to the bus 150, and when '0' is output from the third circuit 165, a value which is output from the second memory controller 1320 is transmitted to the bus 150. The second multiplexer 1332 and the third multiplexer 1333 output a value which is input from a bus 150 according to a value output from a third circuit 165, to the first memory controller 1310 or the second memory controller 1320.

According to exemplary embodiments of the present general inventive concept illustrated and described in connection with FIGS. 12 and 13, the first memory 110, that is, such as a MASKROM, and the second memory 120, that is, such as an internal memory, can be allocated to the same address area, and used selectively according to the boot order. That is, after a code stored in the first memory 110 is used first, at the final stage, only bus command '1' and data input '1' can be effective within the switching unit 1330 by setting the register 1311. Even if the CPU 130 accesses to the same address, the second memory 120 is connected, and thus, security of the first memory 110 is increased and/or strengthened. Although FIG. 13 illustrates that the register 1311 is disposed inside the first memory controller 1310, it is not limited to this case certainly. For example, the register 1311 can be disposed outside the first memory controller 1310, and various logic circuit which may be set at the initial stage (i.e., set only once and not to be changed later) can be embedded in the first memory controller 1310 instead of the register 1311.

As the switching unit 1330 is prepared (e.g., by setting the register 1311, and/or according to the outputs from the second memory controller 1320 and/or the second circuit 160), the system on chip 100 does not need to connect directly to slaves such as the first memory controller 1310 and the second memory controller 1320 with the bus 150, and thus, the size of the logic can be reduced.

In the exemplary embodiments of the present general inventive concept as discussed above, the system on chip 100 performs initialization or a secure boot by using various software codes stored in the first memory 110, the third memory 140, etc. However, there is a risk that an ill-intentioned person may perform hacking directly on the ROM inside the system on chip 100, for example, the first memory 110, through a decapsulating process. Thus, in an exemplary embodiment of the present general inventive concept, a software code can be generated in the system on chip 100 autonomously and can be used, as discussed in detail below.

Figure 14:
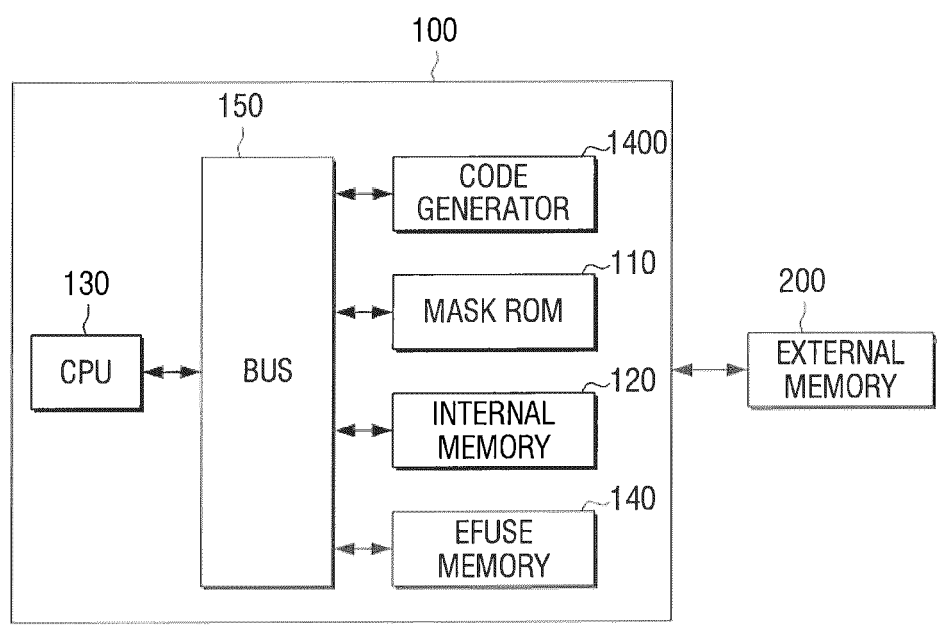
FIG. 14 and FIG. 15 are block diagrams illustrating an example of a system on chip according to an exemplary embodiment of the present general inventive concept.

FIG. 14 is a block diagram illustrating the system on chip 100 according to an exemplary embodiment of the present general inventive concept. As illustrated in FIG. 14, the system on chip 100 includes the first memory 110, the second memory 120, the CPU 130, the third memory 140, the bus 150, and a code generating unit 1400. The first memory 110, the second memory 120, the CPU 130, the third memory 140, and the bus 150 are described in detail above.

The code generating unit 1400 generates one or more software codes. The CPU 130 can use not only data stored in the first to third memories 110, 120, and 140, but also a software code generated in the code generating unit 1400.

As described above, various data, such as a code to initialize a system, a code to decrypt an encrypted external program code, and decryption key, etc. can be stored in the first memory 110. The code generating unit 1400 can generate at least a part of data which are stored in the first memory 110, and provide the CPU 130 with the data.

The CPU 130 can perform initializing by using a software code generated in the code generating unit 1400, along with data stored in the first memory 110. For example, not all initialization codes are stored in the first memory 110, and, in some exemplary embodiments of the present general inventive concept, some codes not stored are generated by the code generating unit 1400. Herein, the CPU 130 can perform initializing by receiving some software codes from the code generating unit 1400 while approaching a reset vector and reading an initialization code in the first memory 110. In an exemplary embodiment of the present general inventive concept, the CPU 130 can perform various operations by using a value stored in the first memory 110 and data output from the code generating unit 1400. Therefore, even if the first memory 110 is hacked, the third person (i.e., the hacker) cannot know the entire initialization code.

Figure 15:
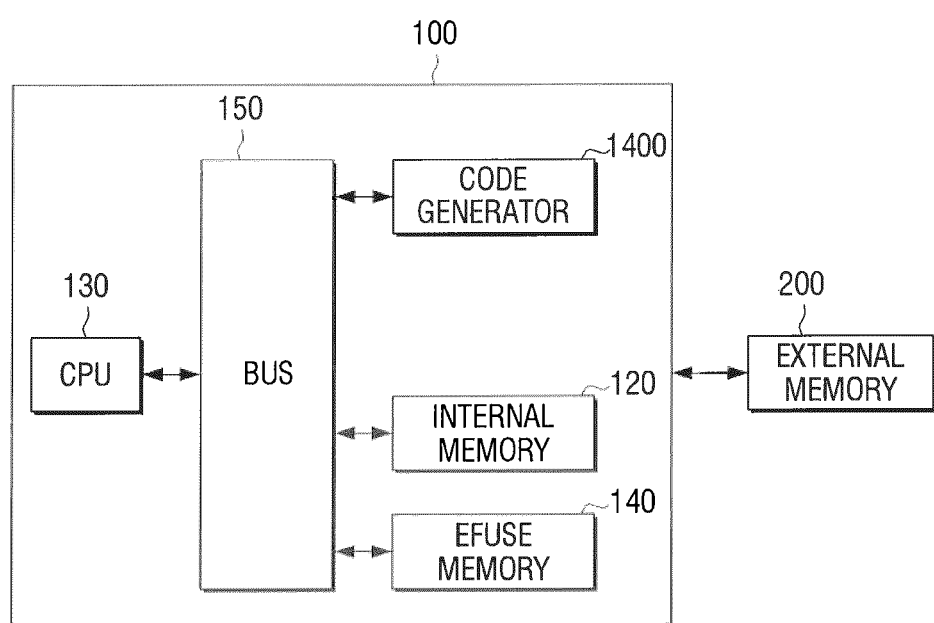

FIG. 15 illustrates the system on chip according to an exemplary embodiment of the present general inventive concept. As illustrated in FIG. 15, the system on chip 100 excludes the first memory 110, and includes the code generating unit 1400. The system on chip 100 includes the second memory 120, the CPU 130, and the third memory 140, and the bus 150, which are described in detail above. The code generating unit 1400 can generate various data such as a system initialization code, a decrypted code, an decryption key, etc. The CPU 130 inputs an address to the code generating unit 1400, and receives a software code which is generated according to the address. Thus, in the exemplary embodiment illustrated in FIG. 15, which does not include the first memory 110, the CPU 130 can perform initialization by using codes generated by the code generating unit 1400 (e.g., as opposed to those stored in a memory, such as first memory 110).

Figure 16:
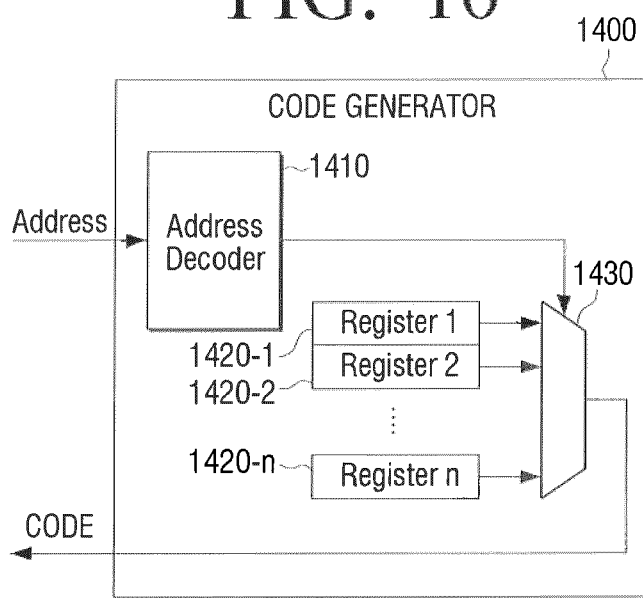
FIG. 16 is a view illustrating an example of a code generating unit which is usable in exemplary embodiments of the present general inventive concept illustrated in FIGS. 14 and 15.

FIG. 16 illustrates an exemplary embodiment of the code generating unit 1400 which is used in the exemplary embodiments of the present general inventive concept illustrated in FIG. 14 and/or FIG. 15. As illustrated in FIG. 16, the code generating unit 1400 includes an address decoder 1410, a plurality of registers 1420-1, 1420-2, to 1420-n, and a multiplexer 1430. The address decoder 1410 may be a circuit, an integrated circuit, a field programmable gate array, a programmable logic device, and/or any suitable device to decode an address. The registers 1420-1, 1420-2, and 1420-n may be registers in one or more memory devices.

The address decoder 1410 receives an address from the CPU 130, and decodes the address. The multiplexer 1430 receives the decoded address in the address decoder 1410 and accesses one or more of the plurality of registers 1420-1 to 1420-n according to the address.

Specifically, the multiplexer 1430 selectively reads register values (e.g., data values in one or more registers) stored in the register designated by the address decoded in an address decoder 1410, from among the plurality of registers 1420-1 to 1420-n, and generates a software code by combining the register values.

Figure 17:
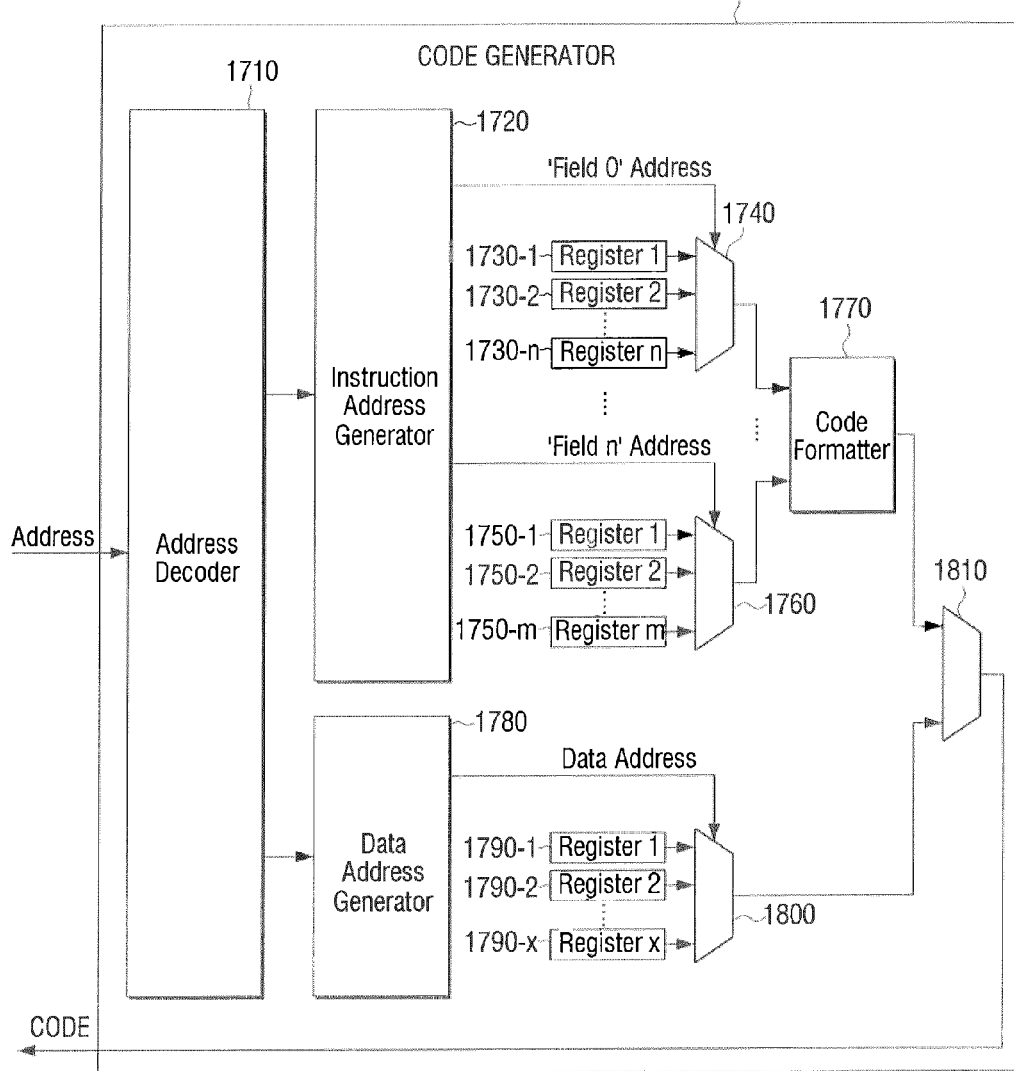
FIG. 17 is a view illustrating an exemplary embodiment of a code generating unit of FIG. 16.

FIG. 17 illustrates an exemplary embodiment of a code generating unit according to the present general inventive concept. The code generating unit 1700 illustrated in FIG. 17 may take the place of code generating unit 1400 illustrated in FIGS. 14 and/or 15. As illustrated in FIG. 17, the code generating unit 1700 includes an address decoder 1710, a first generating unit 1720, a plurality of instruction registers 1730-1 to 1730-n and 1750-1 to 1750-m, a plurality of instruction multiplexers 1740 and 1760, a code formatter 1770, a second generating unit 1780, a plurality of data registers 1790-1 to 1790-x, a data multiplexer 1800, and a multiplexer 1810.

An address decoder 1710 receives an address from the CPU 130 and decodes the address, and provides the first generating unit 1720 and the second generating unit 1780 with the decoded address. The first generating unit 1720 reads an instruction address from the decoded address in the address decoder 1710, and generates the instruction address. The instruction address generated in the first generating unit 1720 is provided to the plurality of instruction multiplexers (e.g., instruction multiplexers 1740 and 1760, respectively).

Although FIG. 17 illustrates only two instruction multiplexers 1740 and 1760, the number of the instruction multiplexers can be changed according to the number of the group which distinguishes the instruction register. That is, instruction registers may be grouped according to the number of outputs from the first generating unit 1720 which outputs instruction addresses, and a multiplexer may be provided for each group of instruction registers.

The instruction registers 1730-1 to 1730-n and 1750-1 to 1750-m can be grouped according to the field constituting a software code, and distinguished into a plurality of groups. The instruction registers 1730-1 to 1730-n and 1750-1 to 1750-m can store a specific code to constitute a software code, or at least one bit data. FIG. 17 illustrates an instruction register distinguished into total n groups (e.g., registers 1730-1, 1730-2, and 1730-n).

A plurality of instruction multiplexers 1740 and 1760 selectively read a register value (e.g., a data value in a register) from an instruction register (e.g., instruction registers 1730-1 to 1730-n and 1750-1 to 1750-m) which is matched according to an instruction address. For example, when a first, a third, a fourth, and a fifth registers within a first group, and a second, a third, a fifth, and a sixth registers within a nth group are designated in an instruction address, the first multiplexer 1740 which is matched with a first group reads a register value from a first, a third, a fourth, and a fifth registers 1740-1, 3, 4, and 5. The first multiplexer 1760 which is matched with then group reads a register value from a second, a third, a fifth, and a sixth registers 1750-2, 3, 5, and 6. The read values are transmitted to a code formatter 1770.

The code formatter 1770 combines the values which are read from the plurality of instruction multiplexers 1740 and 1760, and generates the code (i.e., instructions). The code formatter 1770 may be, for example, a circuit and/or any suitable device to combine values and generate the code and/or instructions.

A second generating unit 1780 generates a data address based on the address which is decoded in an address decoder 1710. The second generating unit 1780 provides a data multiplexer 1800 with the generated data address.

The data multiplexer 1800 selectively reads a register value (e.g., a data value in a register) from a plurality of data registers 1790-1 to 1790-x according to the data address. Various data are divided partially and can be stored in one or more of the plurality of data registers 1790-1 to 1790-x. One or more of the register values (e.g., data values stored in the registers 1790-1 to 1790-x) which is received by the data multiplexer 1800 are multiplexed by the data multiplexer 1800 and are provided to the multiplexer 1810.

The multiplexer 1810 may combine a code generated in the code formatter 1770 and data generated in the data multiplexer 1800, and generate a software code. The generated software code can be provided to the CPU 130 or can be copied to the second memory 120.

The CPU 130 can perform not only an initialization operation but also various operations by using a software code generated in the code generating unit 1400.

Figure 18:
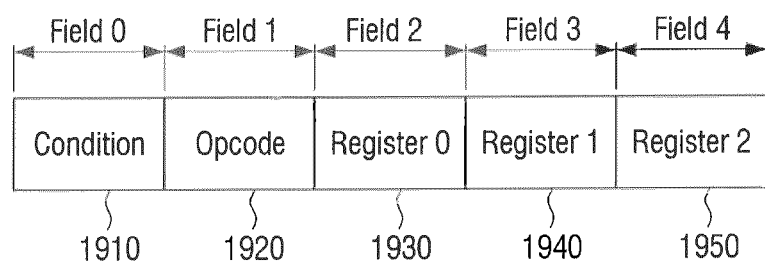
FIG. 18 and FIG. 19 are views illustrating exemplary embodiments of the present general inventive concept of a software code which is generated in a code generating unit of FIG. 19.
Figure 19:
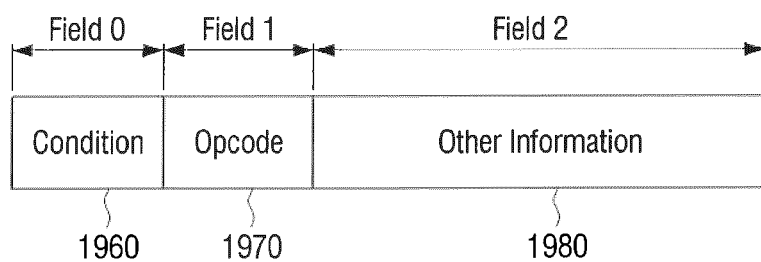

FIGS. 18 and 19 are views illustrating various exemplary embodiments of the present general inventive concept of a software code generated in the code generating unit (e.g., code generating unit 1400 illustrated in FIGS. 14 and 15, and/or code generating unit 1700 illustrated in FIG. 17).

According to FIG. 18, a software code can include a plurality of fields 1910 to 1950. Various data such as a condition (illustrated as Field 1910 in FIG. 18), an Opcode (i.e., an operation code that specifies the operation to be performed; illustrated as Field 1920 in FIG. 18), and a register value (e.g., values in any of Registers 0, 1, or 2 illustrated in Fields 1930, 1940, and 1950, respectively in FIG. 18) can be stored in one or more of the fields 1910 to 1950. The code generating unit 1400 or the code generating unit 1700 can generate a software code as illustrated in FIG. 18 by reading register values respectively from a register of a group corresponding to the each field, and combining the values (e.g., by using a multiplexer.

FIG. 19 illustrates an exemplary embodiment of the present general inventive concept of a software code. While a software code in FIG. 18 can include fields which are the same size, a software code in FIG. 19 can include fields whose sizes are different from each other. As illustrated in FIG. 19, a condition field 1960 and an Opcode (i.e., operation code) field 1970 are prepared, and the other data can be stored in a separate field 1980. That is, the condition field 1960 and the Opcode field 1970 can be the same size, and the separate field 1980 can be a different (i.e., larger) size. Alternatively, condition field 1960, Opcode field 1970, and separate field 1980 may each be of a different size.

A software code can be configured in various forms. Generally, a software code is divided according to a certain section such as a command part, an operator part, etc. These commands are usually similar according to the section, and thus, if a code is optimized, and a hardware device is created in consideration of the optimized code, it is possible to reduce the size of a hardware device. That is, code may be optimized so as to be executes more rapidly, or such that it is operating with less memory storage or other resources, or draws less power. The hardware device, such as the system on chip 100, may be reduced in size by, for example, reducing the amount and/or size of memory (e.g., first memory 110, second memory 120, and/or third memory 140). The hardware device (e.g., the system on chip 100) may also consume less power when the optimized code is executed.

As described in the above various exemplary embodiments of the present general inventive concept, an encryption program or encryption data is stored in the external memory 200 (illustrated, for example, in FIGS. 1, 3, 4, 7, and 13-15) which is not embedded in the system on chip 100. The external memory 200 can be a non-volatile flash memory in which data can be read from or written to.

The flash memory (i.e., the non-volatile memory 200) may be of various types according to an interface specification and an internal structure. Specifically, the flash memory can be a serial and/or parallel flash memory based on the CPU 130 and interface specification, and may be a NAND or a NOR flash based on the internal structure of the flash memory.

Figure 20:
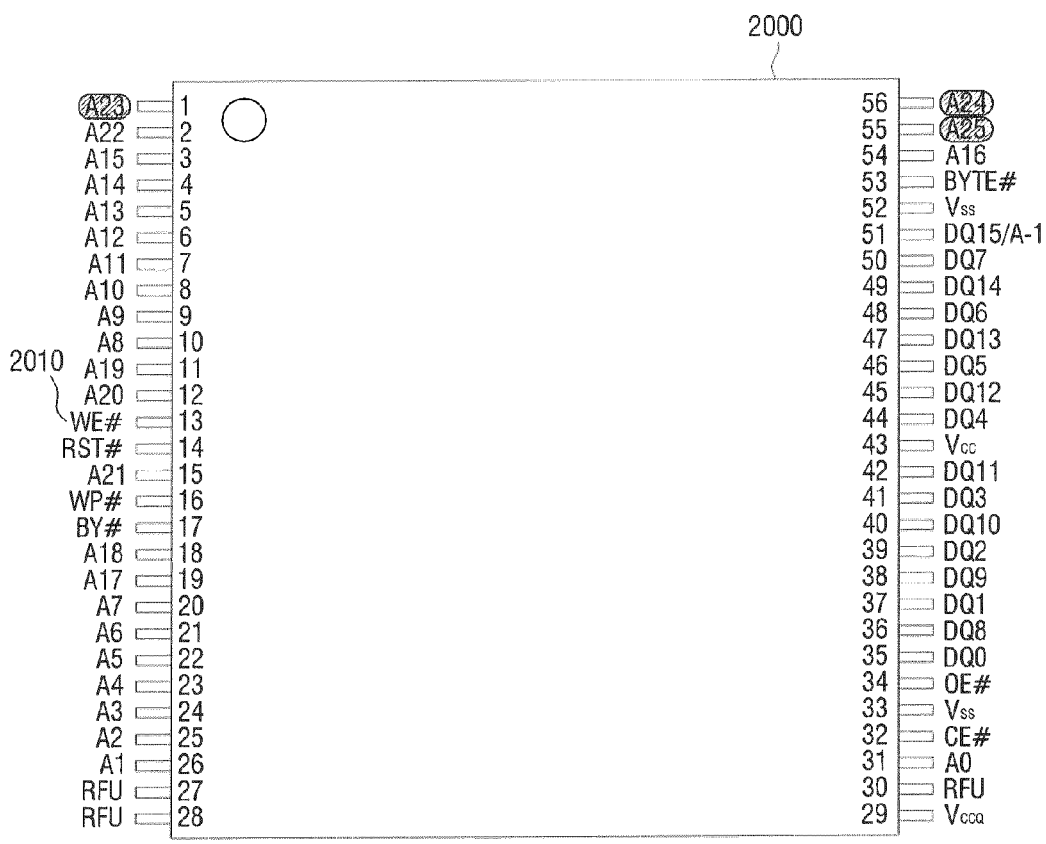
FIGS. 20-22 are exemplary embodiments of the present general inventive concept of various non-volatile memories which are usable with a system on chip.

FIG. 20 illustrates a pin structure of a NOR flash memory 2000. The NOR flash memory 2000 may be used as the non-volatile flash memory 200 illustrated in FIGS. 1, 3, 4, 7, and 13-15. As illustrated in FIG. 20, the NOR flash memory 2000 can include various pins such as a WE# pin 2010. The WE# pin 2010 is used to control an operation of a bus write of a command interface. That is, when a signal is received by WE# pin 2010, a write operation can be performed on the NOR flash memory 2000.

Figure 21:
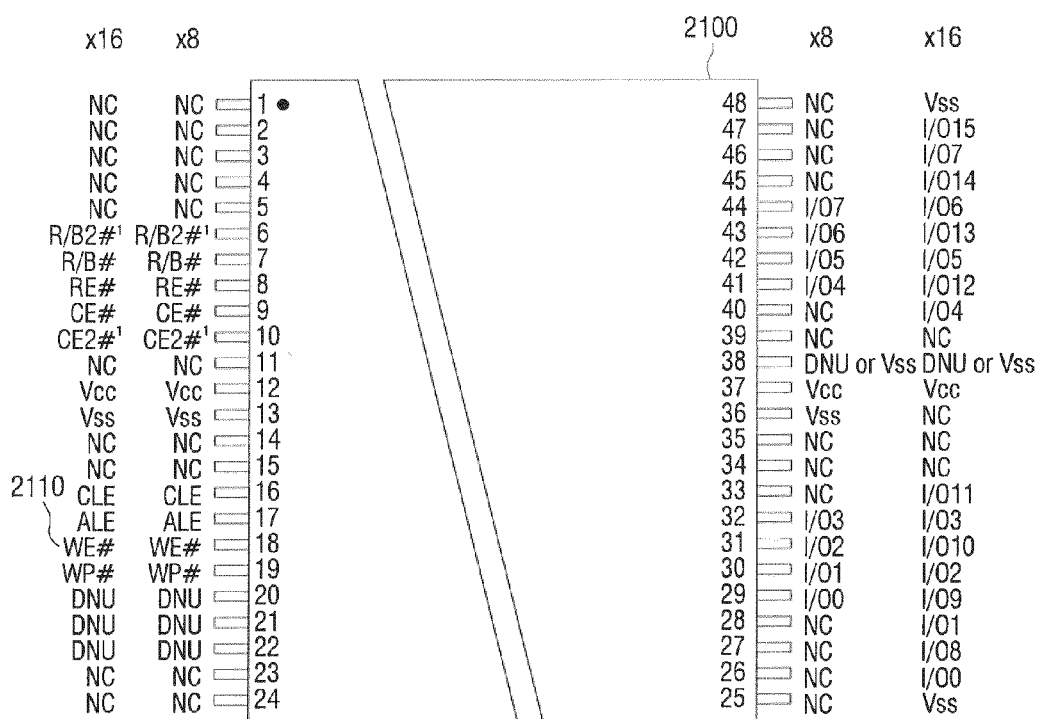

FIG. 21 illustrates a pin structure of a NAND flash memory 2100. The NAND flash memory 2100 may be used as the non-volatile flash memory 200 illustrated in FIGS. 1, 3, 4, 7, and 13-15. As illustrated in FIG. 21, the NAND flash memory 2100 can include various pins such as a WE# pin 2110. The WE# pin 2110 is used to receive a writing signal for the NAND flash memory 2100.

Figure 22:
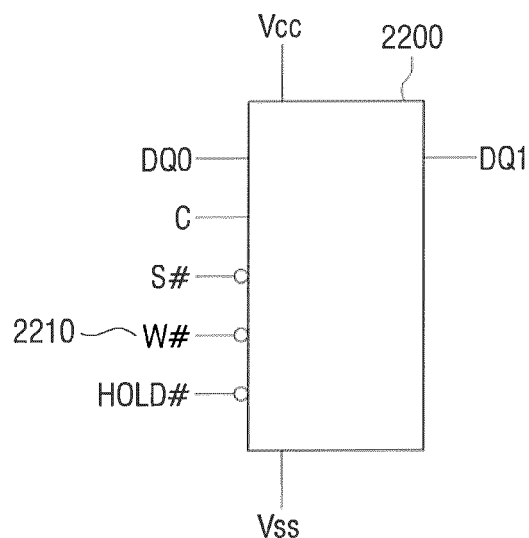

FIG. 22 illustrates a pin structure of a serial peripheral interface (SPI) flash memory 2200. The SPI flash memory 2200 may be used as the non-volatile flash memory 200 illustrated in FIGS. 1, 3, 4, 7, and 13-15. According to FIG. 22, the SPI flash memory 2200 includes a W# pin 2210 for a writing operation.

The CPU 130 can perform a writing operation by using a pin embedded in each flash memory (e.g., the non-volatile memory 200, which may be the NOR flash memory 2000, NAND flash memory 2100, and/or SPI flash memory 2200). As described above, the flash memory is encrypted, but the decryption key value of the system on chip 100 can be exposed. When the decryption key value is exposed, there is a risk that the firmware stored in the flash memory may be changed. Thus, it is necessary to minimize and/or prevent the flash memory from being changed in advance. According an exemplary embodiment of the present general inventive concept, a writing pin of an external memory can be inactivated. That is, the WE# pin 2010 of the NOR flash memory 2000, the WE# pin 2110 of NAND flash memory 2100, and/or the W# pin 2210 of the SPI flash memory 2200 may be inactivated so as to minimize and/or prevent the flash memory from being changed by an unauthorized operation (i.e., a hacking operation).

Figure 23:
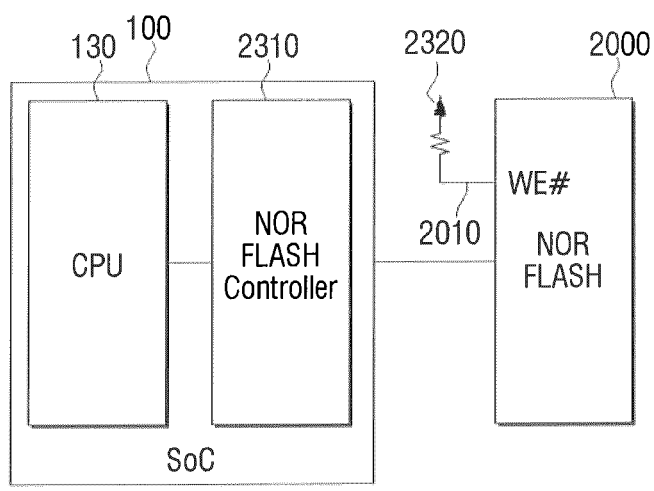
FIG. 23 is a view illustrating a method of processing a write pin of a volatile memory to be inactivated according to an exemplary embodiment of the present general inventive concept.

FIG. 23 is a view illustrating the system on chip 100 and a structure of an external memory according to an exemplary embodiment of the present general inventive concept. FIG. 23 illustrates a case that a NOR flash memory (such as the NOR flash memory 2000 illustrated in FIG. 20) is used as an external memory (e.g., the non-volatile memory 200). Herein, the system on chip 100 can further include a NOR flash controller 2310 to control a NOR flash memory 2000. The NOR flash controller 2310 can be, for example, a circuit and/or integrated circuit to control the operations of the NOR flash memory 2000, such as a read operation and/or a write operation.

The CPU 130 can read various data and software which are stored in the NOR flash memory 2000 through the NOR flash controller 2310. The CPU 130 can output a writing signal to the NOR flash memory 2000 through the NOR flash controller 2310.

However, as illustrated in FIG. 23, the writing pin 2010 of the NOR flash memory 2000 can be inactivated. The process of inactivating can be performed with various methods. FIG. 23 illustrates a state where a writing pin is tied to an inactivated terminal 2320 which is prepared in a main board embedded the system on chip 100 and the NOR flash memory 2000. Herein, even if a writing signal is output in the NOR flash controller 2310, the writing signal cannot be input to the writing pin 2010, and thus, it is impossible to change data of the NOR flash memory 2000 when the writing pin 2010 is inactivated.

FIG. 23 illustrates only the NOR flash memory 2000, but as described above, the non-volatile memory, that is, an external memory (e.g., the non-volatile memory 200) can be configured as various forms, such as the NAND flash memory 2100 or the SPI flash memory 2200, etc., and one system on chip 100 can be connected with various types of flash memories. The writing pin can be inactivated in these flash memories 2100 and 2200, thus blocking a data change operation.

According to an exemplary embodiment of the present general inventive concept, when the system on chip meets a specific condition, writing for an external memory can be performed.

Figure 24:
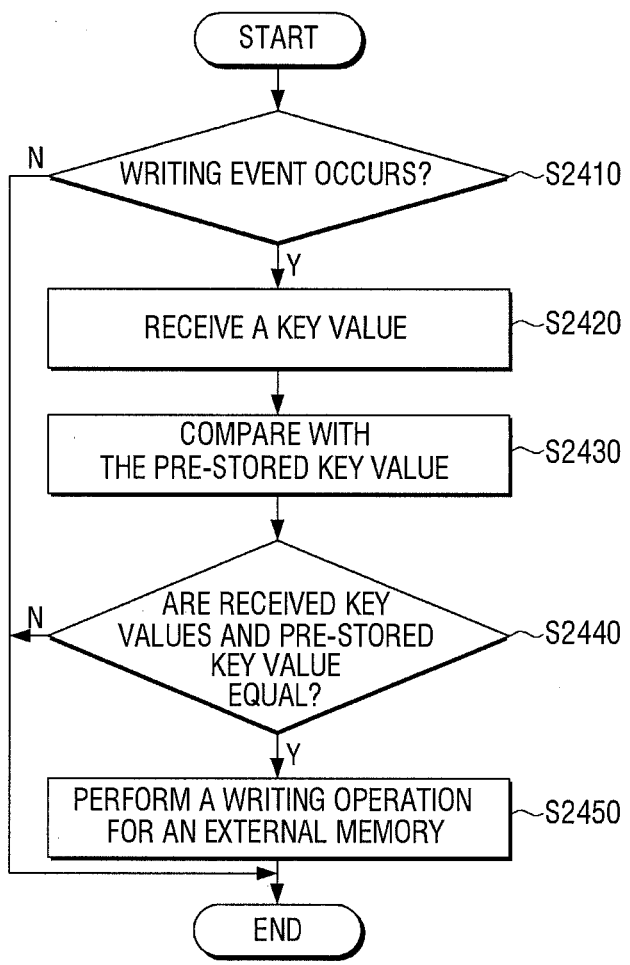
FIG. 24 is a flowchart illustrating a method of controlling a memory according to an exemplary embodiment of the present general inventive concept.

FIG. 24 is a flowchart illustrating a method of controlling a memory according to an exemplary embodiment of the present general inventive concept. According to the exemplary embodiment, the system on chip 100 can include a memory controller to control access to an external non-volatile memory.

When a writing event occurs at operation S2410, the memory controller receives a writing signal and a first key value from the CPU 130 at operation S2420. A user can input a first key value that is received by the system on chip 100 via a user interface (e.g., user interface 1300 illustrated in FIG. 10), or the first key value can be input from the CPU 130 automatically. The CPU 130 can randomly select one of the pre-stored plurality of key values, and can input the number of the selected key value to a memory controller, or can input the key value itself.

When a first key value is received at operation S2420, the memory controller (e.g., the NOR flash Controller 2310 illustrated in FIG. 23) compares the received first key value with the pre-stored second key value at operation S2430. When it is determined at operation S2440 that the two key values are the same as each other, the memory controller (e.g., the NOR flash Controller 2310 illustrated in FIG. 23) performs a writing operation for an external memory (e.g., NOR flash 2000 illustrated in FIG. 23) at operation S2450. When the received first key value is not the same as the pre-stored second key value at operation S2430, the memory controller blocks and/or prevents a writing operation to the external memory.

Figure 25:
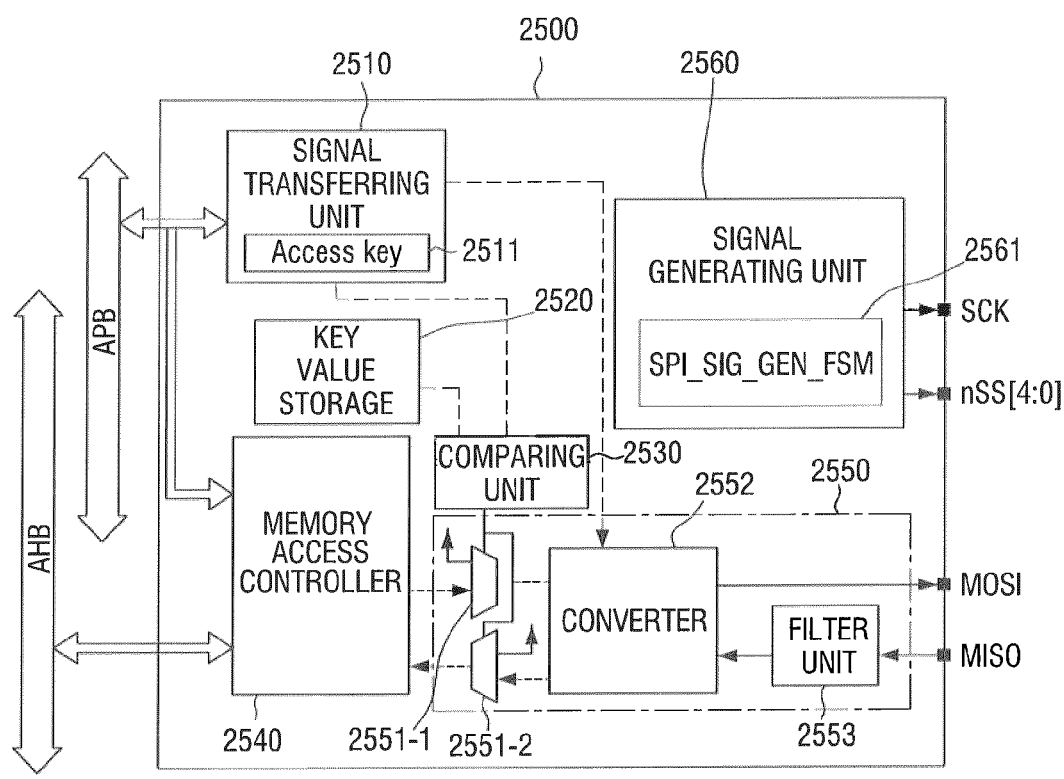
FIG. 25 is a view illustrating an exemplary embodiment of a memory controller to perform a method of controlling a memory of the exemplary embodiment of the present general inventive concept illustrated in FIG. 24.

FIG. 25 is a view illustrating an exemplary embodiment of the memory controller which performs a method of controlling a memory, as illustrated in FIG. 24. According to FIG. 25, the memory controller 2500 includes a signal transferring unit 2510, a key value storage 2520, a comparing unit 2530, a memory access controller 2540, a signal processor 2550, and a signal generating unit 2560. In exemplary embodiments of the present general inventive concept, the memory controller 2500 may be substituted for the NOR flash controller 2310 illustrated in FIG. 23. The signal transferring unit 2510 may be a circuit, and integrated circuit, and/or any suitable device to compare and transfer signals according to exemplary embodiments of the present general inventive concept disclosed herein. The key value storage 2520 may be a memory device. The comparing unit 2530 may be a circuit, an integrated circuit, a programmable logic unit, or a field programmable gate array and/or any suitable device to compare signals.

The signal generating unit 2560 may be a circuit, an integrated circuit, a programmable logic unit, or a field programmable gate array and/or any suitable device to generate a signal (e.g., a clock signal, a slave select and/or chip select signal, etc.) according to exemplary embodiments of the present general inventive concept. The signal generating unit 2560 may receive and generate signals so as to communicate with one or more devices communicatively coupled to a interface, such as a Serial Peripheral Interface (SPI). The signal generating unit 2560 may communicate with, for example, sensors, control devices, communications interfaces, memory, and/or a display that my be mounted, for example, on main board 300 illustrated in FIG. 4 and described above. Finite state machine 2561 which may generate and output one or more operating states of the signal generating unit during the communication with one or more devices.

As illustrated in FIG. 25, a signal transferring unit 2510 receives various signals through the bus (e.g., the bus 150 illustrated in FIGS. 4 and 13-15) such as APB (the Advanced Peripheral Bus), and transfers the signals to the comparing unit 2530 or the signal processor 2550, etc. Specifically, when a first key value is transmitted from the CPU 130, the signal transferring unit 2510 stores a first key value inside the register 2511, and provides the comparing unit 2530 with the stored first key value.

At least one second key value can be stored in the key value storage 2520.

When a first key value is transferred through the signal transferring unit 2510, the comparing unit 2530 compares a second key value stored in the key value storage 2520 with a received second key value.

A comparing unit 2530 can output a signal such as '0' or '1' according to the compared result. That is, the comparing unit 2530 can compare the first key value and the second key value, and output a signal according to whether the first key value is the same as the second key value (e.g., a '1' can be output by the comparing unit 2530), and output a different signal when the first key value is different from the second key signal (e.g., a '0' can be output by the comparing unit 2530).

A signal processor 2550 can selectively output a writing signal transmitted from the CPU 130 to an external non-volatile memory (e.g., non-volatile memory 200 illustrated in FIGS. 1, 3, 4, 7, and 13-15, and/or NOR flash memory 2000 illustrated in FIG. 23), according to the compared result as determined by the comparing unit 2530. The signal processor 2550 can transfer a signal which is read in an external non-volatile memory 200 to the memory access controller 2540.

A signal processor 2550 can include a first switch 2551-1 to control a writing operation, a second switch 2551-2 to control a reading operation, a converter 2552 to convert a sent or received signal into a predetermined format data, and a filter unit 2553, etc. The first switch 2551-1 or the second switch 2551-2 can be one or more logic circuits. The converter 2552 and the filter unit 2553 may be circuits, integrated circuits, and/or any suitable device to convert a signal or filter a signal, respectively, according to the exemplary embodiments disclosed herein. Thus, the memory access controller 2540 and the converter 2552 can be connected or blocked according to an output value of compared result from the comparing unit 2530.

For example, when a first key value, which is stored in the register 2511, is different from a second key value, which is stored in the key value storage 2520, the comparing unit 2530 outputs '0', and when a first key value is the same as a second key value, the comparing unit 2530 can output '1'. When the comparing unit 2530 outputs '0', the first switch 2551-1 can disable the connection with the converter 2552. Accordingly, when the first switch 2551-1, which controls a writing operation, disables a connection with the converter 2552, nothing can be output. That is, a connection between the memory access controller 2540 and the converter 2552 of the signal processor 2550 is disabled by the first switch 2551-1. Alternatively, a fixed value, for example, only '0', can be output even if any value is input from the memory access controller 2540. When '1' is output from the comparing unit 2530, the first switch 2551-1 transfers a signal output from the memory access controller 2540 to the converter 2552.

The converter 2552 converts a writing signal output from the memory access controller 2540 into a memory data, and transmits the data to an external non-volatile memory 200 (e.g., as illustrated in FIGS. 1, 3, 4, 7, and 13-15), or alternatively, NOR flash memory 2000 illustrated in FIG. 23.

The filter unit 2553 filters data which is read from the non-volatile memory 200 (e.g., as illustrated in FIGS. 1, 3, 4, 7, and 13-15, or alternatively, NOR flash memory 2000 illustrated in FIG. 23), and transfers the data to the converter 2552. The converter 2552 provides the second switch 2551-2 with the transferred data. The second switch 2551-2 is configured to transfer a value input from the converter 2552 to the memory access controller 2540. When '0' is input from the comparing unit 2530, the second switch 2555-2 also disables the connection between the converter 2552 and the memory access controller 2540, and when '1' is input from the comparing unit 2530, the second switch 2555-2 connects the converter 2552 and the memory access controller 2540. FIG. 25 illustrates the second switch 2551-2 along with the first switch 2551-1, but according to an exemplary embodiment of the present general inventive concept, the second switch 2551-2 can be omitted, such that a reading operation is always available. That is, in exemplary embodiments of the present general inventive concept, the second switch 2551-2 may be omitted so that data can be read from the non-volatile memory 200 or the NOR flash memory 2000, and the read data being provided to the converter 2552 and the memory access controller 2540, so that the read data can be provided to the CPU 130.

The memory access controller 2540 performs a writing operation or a reading operation regarding an external memory 200 (e.g., as illustrated in FIGS. 1, 3, 4, 7, and 13-15, or alternatively, NOR flash memory 2000 illustrated in FIG. 23) according to a writing signal or a reading signal, which is input through APB or AHB (the Advanced High performance Bus). As described above, when a first key value input from the CPU 130 (and, e.g., stored in register 2511 of the signal transferring unit 2510) is the same as a pre-stored second key value (e.g., as stored in the key value storage unit 2520), the memory access controller 2540 can write various data in the non-volatile memory 200 (or, alternatively, in the NOR flash 2000 illustrated in FIG. 23). If not, the memory access controller 2540 cannot write data in the non-volatile memory 200, even if the memory access controller 2540 outputs a wiring signal.

As described above, according to various exemplary embodiments of the present general inventive concept, attempting to change a program or data which is stored in a non-volatile memory can be minimized and/or prevented.

As in the exemplary embodiments of the present general inventive concept described above, an encrypted code can be stored in a non-volatile memory. When a key value does not exist, this code cannot be decrypted. However, when a key value is exposed, an encrypted code stored in a non-volatile memory can be used by being decrypted, and can be used by generating a firmware code which was modified randomly. Even if a key value cannot be read from an image forming apparatus, the key value can be leaked inside the manufacturer of the image forming apparatus. Exemplary embodiments of the present general inventive concept disclosed herein minimize and/or prevent a firmware code from being changed randomly by a hacker when a key value is exposed.

Figure 26:
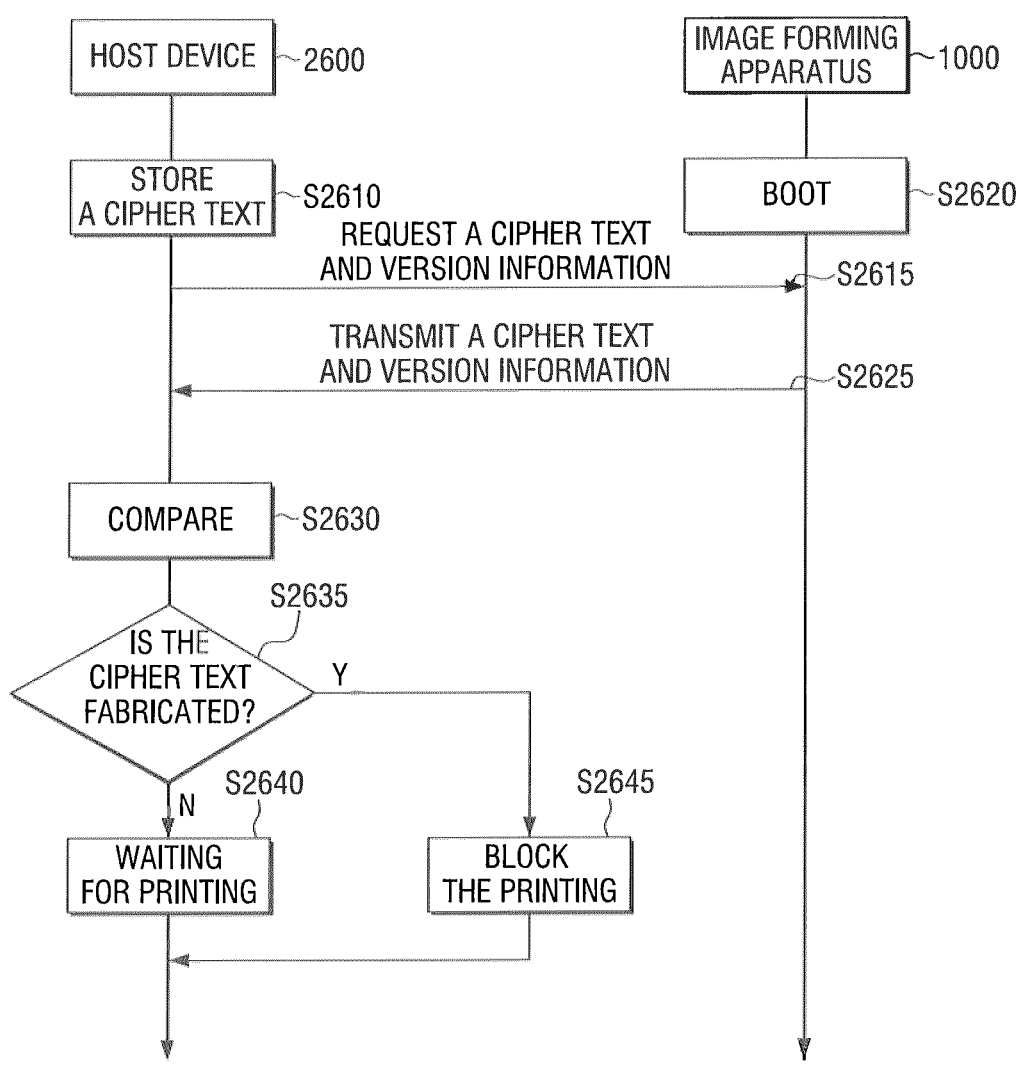
FIG. 26 is a timing diagram illustrating a method of controlling printing according to an exemplary embodiment of the present general inventive concept.

FIG. 26 is a flowchart illustrating a method of controlling printing according to an exemplary embodiment of the present general inventive concept. As illustrated in FIG. 26, a host device 2600 communicates with an image forming apparatus 1000, and controls operations of the image forming apparatus 1000. The communication between the host device 2600 and the image forming apparatus 1000 may be via a wired and/or wireless communication link. The host device 2600 may be a server, a personal computer, a laptop computer, a tablet computer, a smartphone, a portable media player, a digital camera, and/or any other electronic device.

As described above, when a key value stored in an image forming apparatus 1000 is exposed, it is possible to change a firmware. Thus, a hacker can encrypt or decrypt randomly, or perform encryption and/or decryption according to the commands of the hacker, and thus, it is difficult to manage an image forming apparatus. In this exemplary embodiment of the present general inventive concept, the host device 2600 compares a cipher text used by an image forming apparatus 1000 with a pre-stored cipher text, and can determine whether the image forming apparatus 1000 is in normal state or hacked state.

Specifically, the host device 2600 stores a cipher text at operation S2610. A cipher text includes a program such as a firmware that is encrypted as a predetermined key value. A firmware can be updated (e.g., frequently updated, periodically updated, etc.) so as to improve the capacity or capabilities of the image forming apparatus 1000, and is generated to be a new version. Thus, the cipher text changes according to the firmware version, but a cipher text of the same version firmware is the same at all times. When a key value is exposed and a firmware is hacked, the modified firmware performs operating normally, but the cipher text of the modified firmware changes to another version which is different from the vision issued normally. The host device 2600 can match a cipher text of a firmware encrypted normally with version information of the firmware, and store them. A cipher text and version information can be stored along with a printer driver of the host device 2600.

When an event occurs (e.g., a randomly occurring event), the host device 2600 can request a cipher text and version information to the image forming apparatus 1000 at operation S2615. Herein, the event can include various events such as an event whose predetermined time interval is nearing, an event where a printing command is input, an event where a printer driver is established, an event where the communication between the host device 2600 and the image forming apparatus 1000 is connected, and an event that the image forming apparatus 100 is turned on and the booting is completed. Besides those events, an event can include various situations such as checking whether a cipher text is fabricated or not.

When a request for a cipher text and version information is received from the host device 2600 at operation S2615 while a boot is completed at operation S2620, the image forming apparatus 1000 transmits a pre-stored cipher text and version information to the host device 2600 at operation S2625.

The host device 2600 can receive a cipher text and version information from the image forming apparatus 1000. The host device 2600 can store various version information and a cipher text matched with the version information. The host device 2600 compares a cipher text matched with the received version information with a received cipher text from among the pre-stored version information at operation S2630.

After comparing the cipher text matched with the received version information with the received cipher text from among the pre-stored version information at operation S2630, when the two cipher texts are not the same with each other, it is determined that the cipher text is fabricated at operation S2635. When it is determined that the cipher text is fabricated, the host device 2600 registers the image forming apparatus 1000 in a printer list in operation S2645. Printers in the printer list can be blocked from performing a printing operation, thus making the image forming apparatus 1000 unavailable.

When it is determined that the cipher is not fabricated, the host device 2600 is operated in a waiting state for printing at operation S2640. When a printing command is input by a user (e.g., the host device 2600 receives the printing command from the user), the host device 2600 transmits printing data and printing job command to the image forming apparatus 1000, and performs printing.

Figure 27:
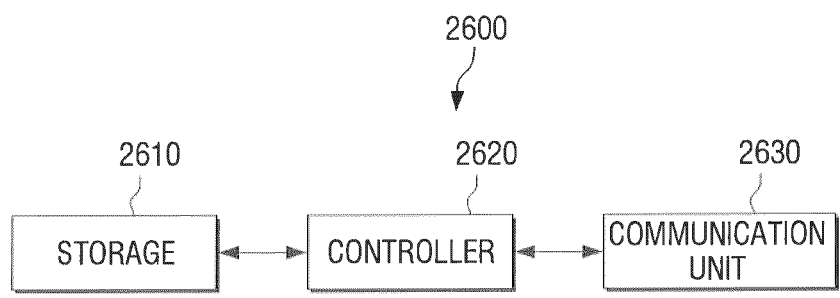
FIG. 27 is a view illustrating an exemplary embodiment of a host device to perform the method of controlling printing according to an exemplary embodiment of the present general inventive concept illustrated in FIG. 26.

FIG. 27 is a block diagram illustrating an exemplary embodiment of the present general inventive concept of a host device to perform a method of controlling printing illustrated in FIG. 26. As illustrated in FIG. 27, the host device 2600 includes a storage 2610, a controller 2620, and a communication unit 2630. The host device 2600 can a PC, a laptop computer, a mobile phone, a PDA, a tablet PC, and a server, etc. The storage 2610 can be a memory device, and the controller can be a CPU, a processor, an integrated circuit, a programmable logic device, a field programmable gate array, and/or any suitable controller device. The communication unit may be any device to receive and transmit data via a wired and/or wireless communication link.

The storage 2610 can store a cipher text. The cipher text can be stored in the storage 2610 individually (i.e., separately from other data stored in the storage 2610) according to a version of various firmwares. When the storage 2610 is connected to one or more devices (i.e., the host device 2600 including the storage 2610 is communicatively connected to one or more devices via the communication unit 2630), a cipher text including identification information, such as a model name, a manufacturer name, a serial number, a firmware name, a firmware version, etc. of each device can be stored individually.

When a predetermined event occurs, the communication unit 2630 can receive a cipher text stored in an image forming apparatus. As described above, the predetermined event may include checking whether a cipher text is fabricated or not occur, a communication unit requesting a cipher text to an image forming apparatus, and receiving the cipher text. Herein, version information and identification information, along with a cipher text, can be received.

The controller 2620 reads a cipher text corresponding to a firmware version of the image forming apparatus 1000, from among cipher texts stored in the storage 2610 by using version information and identification information, etc. which are received from an image forming apparatus 1000. The controller 2620 compares the read cipher text with the received cipher text. When the two cipher texts are the same as each other, the controller 2620 determines that the cipher text is not fabricated, and the controller 2620 controls the image forming apparatus 1000 to be in waiting state for printing. When the two cipher texts are different from each other, the controller 2620 determines that the cipher text is fabricated, and the controller 2620 blocks using the image forming apparatus 1000.

Figure 28:
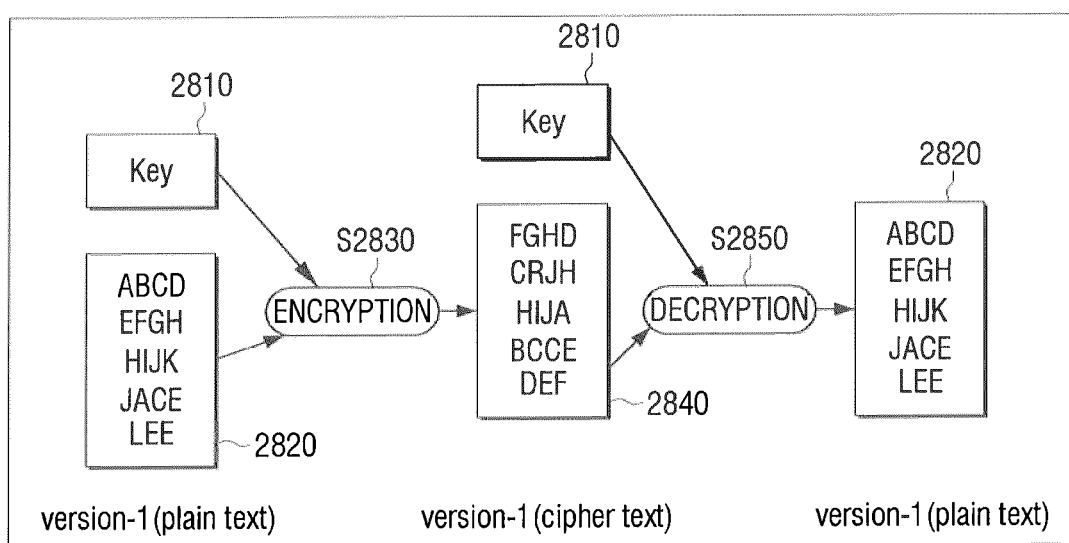
FIG. 28 and FIG. 29 are views illustrating an exemplary embodiment of various cipher texts.
Figure 29:
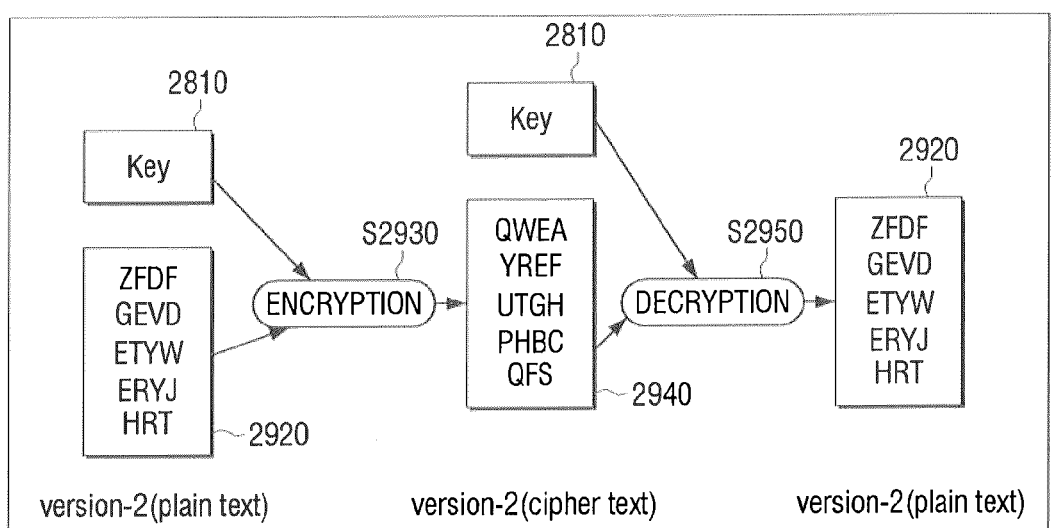

FIGS. 28 and 29 are views illustrating exemplary embodiments of the present general inventive concept of a plain text and a cipher text corresponding to versions which are different from each other. In FIG. 28, when a plain text (version1) 2820 is encrypted by a key value 2810 according to version 1 at operation S2830, the cipher text (version 1) 2840 is generated. The cipher text (version 1) 2840 can be stored in a non-volatile memory. As in the various exemplary embodiments of the present general inventive concept disclosed above, when a boot is performed, or when various operations have to be performed, the CPU 130 reads an encryption code stored in a non-volatile memory (e.g., non-volatile memory 200) or, that is, the cipher text (version1) 2840. The CPU 130 decrypts the cipher text (version 1) 2840 by using the key value 2810 at operation S2850, which is the same as a key value (e.g., key 2810) used in encryption at operation S2830, and generates the plain text (version 1) 2820, and uses the plain text (version 1) 2820.

FIG. 29 is an exemplary embodiment of a plain text and a cipher text according to a version 2. Even if it is assumed that the key value 2810 in FIG. 29 is the same as the key value 2810 of the version 1, the plain text 2920 according to the version 2 is different from the plain text 2820 of the version 1, and thus, the cipher text 2940 after the encryption at operation S2930) is also different from the version 1. At operation S2950, the cipher text 2940 is decrypted by the CPU 130 at operation S2950 using the key value 2810 so as to generate version 2 of the plain text 2920, so that the CPU 130 can use the plain text (version 2) 2920.

As such, a cipher text according to the version of the apparatus is stored in each image forming apparatus and used, but a plurality of cipher texts corresponding to each of a plurality of versions can be stored in the host device 2600.

Figure 30:
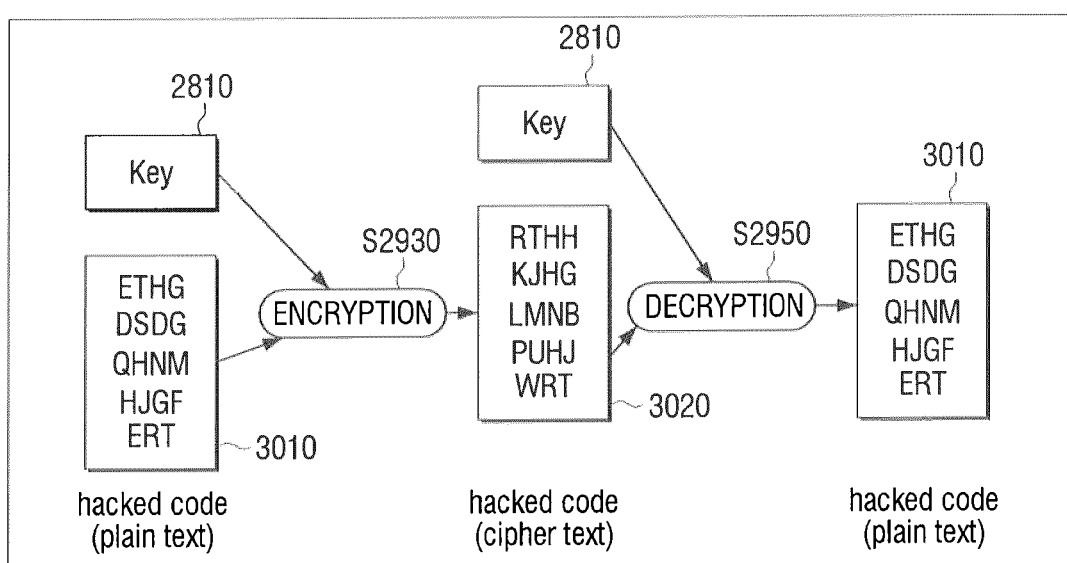
FIG. 30 is a view illustrating an exemplary embodiment of a hacked cipher text.

FIG. 30 illustrates a state that a key value is leaked and a code is hacked. The cipher text 3020 of the hacked code is not an officially issued version, but is a cipher text 3020 which was made by modifying an original text by a hacker so as to generate a new plain text 3010, and then applying the key value 2810 (which is exposed and/or leaked) to the plain text 3010 during the operations S2930 and S2950 of encrypting and decrypting, respectively. That is, the new plain text (i.e., hacked code) 3010 is encrypted at operation S2930 using key 2810 to form the cipher text 3020. The cipher text 3020 is decrypted at operation S2950 using the key 2810 to form the new plain text 3010 (i.e. hacked code). When this cipher text 3020 is stored in a non-volatile memory, the CPU 130 has to perform a boot as a hacker intends, and thus, it is difficult to manage an image forming apparatus normally. However, herein, the cipher text is not registered in the host device 2600, and thus, the host device 2600 can determine whether an image forming apparatus 1000 is in normal state or in hacked state by checking the cipher text.

Specifically, when version information of the image forming apparatus 1000 is not pre-stored version information, or even if it is a pre-stored version information, when a cipher text matching with the version information is different from a cipher text of the image forming apparatus 1000, the controller 2620 determines that the information is in a hacked state. Therefore, the controller 2620 blocks using the corresponding image forming apparatus 1000.

According to this exemplary embodiment, even when a key value is exposed, a firmware can be minimized and/or prevented from being modified by a hacker.

When an image forming apparatus performs boot, a main controller including the system on chip 100 can perform a job that a user requested by controlling the operation of the various consumable units (e.g., the consumable units in an image forming apparatus 1000). As described in FIG. 10, the consumable units 1600-1 to 1600-$n$ can be prepared variously according to the type of the image forming apparatus 1000. One or more of the consumable units 1600-1 to 1600-$n$ can include CRUM chips 1610-1 to 1610-$n$.

CRUM chips 1610-1 to 1610-$n$ can perform authenticating between the main controller 1100 (i.e., which includes the system on chip 100), and when the authentication is completed, the encryption data communication can be performed. The authentication can be performed with various methods.

As an exemplary embodiment of the process of the authentication, if a main controller (e.g., main controller 1100) is to perform authenticating, a request for the authentication can be transmitted to a CRUM chip (e.g., at least one of the CRUM chips 1610-1 to 1610-$n$). Herein, a main controller can transmit a first value to the at least one CRUM chip. The main controller can generate a first value randomly, or can be a pre-stored fixed value. When a request for the authentication is received, a CRUM chip generates a second value (e.g., the value can be randomly generated), and the CRUM chip generates a session key by using a first value and a second value, and then, generates a first MAC (Message Authentication Code). The CRUM chip can transmit the generated first MAC along with the second value to a main controller. A second value, as well as a first value, can be a random value and/or a random fixed value. When the second value is received, the main controller generates a session key by using the first value and the second value which are generated by the main controller, and generates a second MAC by using the session key. The main controller compares the second MAC with the first MAC, and when they are the same, determines that the authentication for the CRUM chip is completed. In this process, the main controller checks the electronic signature information stored in the CRUM chip, and performs authenticating.

When the first MAC is different from the second MAC, the main controller (e.g., main controller 1100 illustrated in FIG. 10) determines that the authentication has failed, and performs the authentication again. Herein, the frequency of performing the authentication can be limited. Alternatively, the authentication may be periodically performed by the main controller.

Figure 31:
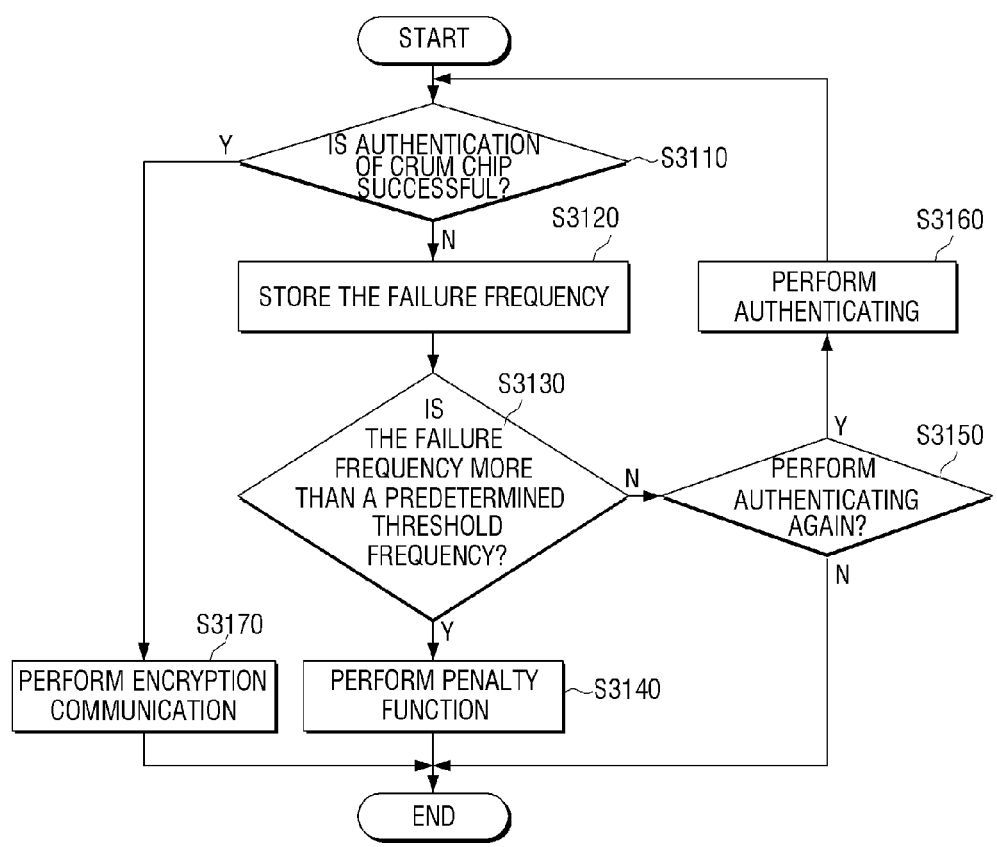
FIG. 31 is a flowchart illustrating a method of controlling an image forming apparatus according to an exemplary embodiment of the present general inventive concept.

FIG. 31 is a flowchart illustrating a method of controlling according to the exemplary embodiment. As illustrated in FIG. 31, operation S3110 determines whether the authentication of a CRUM chip is successful. When the authentication of the CRUM chip has failed, an image forming apparatus stores the failure frequency by counting the number of failures at operation S3120. That is, at operation S3120, the number of times that an authentication of the CRUM chip is performed (and the number of failed authentications) can be counted and stored. The main controller (e.g., the main controller 1100 illustrated in FIG. 10) or the system on chip (e.g., system on chip 100) of the image forming apparatus (e.g., image forming apparatus 1000) determines whether the failure frequency is more than a predetermined threshold frequency at operation S3130.

When it is determined that the failure frequency is more than the threshold frequency at operation S3130, a penalty function is performed at operation S3140. Specifically, a voice message or a visual message indicating that the authentication has failed can be output, or image forming apparatus cannot be turned on, or changed to be in state which the printing is not possible. The connection between the corresponding CRUM chip and the main controller can be blocked, and an external host device or other server devices can be notified that the authentication is failed.

When it is determined that the frequency is less than the threshold frequency at operation S3130, the main controller query a user whether the user wants to perform authenticating again at operation S3150. Thus, when a user requests the authentication again, the main controller performs authenticating with the above described method at operation S3160.

When the authentication is determined to be successful at operation S3110, the main controller performs encryption communication with the corresponding a CRUM chip at operation S3170. For example, the main controller can transmit an encrypted communication message by encrypting various data and commands, and the CRUM chip can reply with an encrypted communication message. The MAC can be used in the encrypted communication message. For example, when a communication message to be transmitted to the CRUM chip is generated, the main controller generates a third MAC by applying a key and encryption algorithm to the data. The communication message can be added by the third MAC, and can be transmitted to the CRUM chip.

A CRUM chip extracts data parts from the received communication message, and generates a fourth MAC by applying the above described key and encryption algorithm. The CRUM chip compares the third MAC read from the transmitted communication message and the generated fourth MAC. When it is determined that the third and fourth MAC are the same, it is regarded as legitimate communication message, and an operation corresponding to the message is performed. When it is determined that the third and fourth MAC are different from each other, it is regarded as an illegitimate communication message, and thus, can be canceled.

As described above, according to various exemplary embodiments of the present general inventive concept, hacking of the image forming apparatus can be minimized and/or prevented. In the above-described various exemplary embodiments, it is explained based on an image forming apparatus for convenience, but the exemplary embodiments of the present general inventive concept are not limited to an operation of an image forming apparatus. That is, various types of electronic devices other an image forming apparatus, the methods of the e above described various exemplary embodiments can be applied.

The above various methods or operations may be performed by a program which is stored in a non-transitory computer readable medium. The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB) memory stick, a memory card, and a read only memory (ROM), and may be provided.

Specifically, a non-transitory computer readable medium which stores a program code can perform initializing using initialization data which is stored in a first memory of a system on chip. When the initializing is performed, decrypting encrypted data which is stored in a non-volatile memory using one of a plurality of decryption keys which are stored in the first memory can be performed. The decrypted data can be in a second memory of the system on chip, and a boot operation can be performed using data which is stored in the second memory in sequence may be used.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A system on chip comprising:
a first memory to store a plurality of decryption keys;
a second memory to store data;
a third memory to store an encryption key setting value;
a CPU to decrypt encrypted data, which is received from an external non-volatile memory, using a decryption key from among the plurality of decryption keys corresponding to the encryption key setting value, to store the decrypted data in the second memory, and to perform a boot operation using the decrypted data stored in the second memory;
a first circuit to restrict access to the CPU via an external port during the boot operation,
wherein the CPU counts a number of times that the decryption of the encrypted data fails,
wherein a penalty function is performed when the number of times that the decryption of the encrypted data fails is more than a threshold,
wherein, when power is switched on, the first circuit outputs a disable signal to disable the access to the CPU, and, when at least the decryption and authentication of the decrypted data is completed, the first circuit outputs an enable signal to enable the access to the CPU,
wherein the first circuit comprises a first register, and
wherein, when the at least the decryption and authentication of the decrypted data is completed, the CPU changes a storage value of the first register;
a second circuit; and
a third circuit to control access to the first memory,
wherein the second circuit comprises a second register, and the third circuit comprises a third register, and
wherein, when the at least the decryption and authentication of the decrypted data is completed, the CPU stores a control value to disable access to the first memory in the second register, and stores a control value to change the access to the first memory to access to the second memory in the third register.

2. The system on chip as claimed in claim 1,
wherein initialization data is stored in the first memory separately from the plurality of decryption keys, and
wherein the CPU performs initialization using the initialization data and decrypts the encrypted data.

3. The system on chip as claimed in claim 1, wherein CPU executes an infinite loop when the decryption fails.

4. The system on chip as claimed in claim 1, wherein, when power is switched on, the CPU identifies a memory that is designated by a setting value stored in the third memory or an external pin, and, when the first memory is designated, the CPU performs a secure boot operation using the encrypted data, and, when the second memory is designated, the CPU performs a normal boot operation using non-encrypted data which is stored in the non volatile memory.

5. The system on chip as claimed in claim 1, wherein the first memory is a mask Read Only Memory (ROM) or a one-time programmable (OTP) ROM,
wherein the second memory is a static random access memory (SRAM), and
wherein the third memory is an electrical fuse (EFUSE) memory.

6. The system on chip as claimed in claim 1, further comprising:
a first memory controller to control access to the first memory;
a second memory controller to control access to the second memory;
a bus; and
a controlled switch to connect selectively one of the first memory controller and the second memory controller with the bus according to the operation state of the CPU.

7. The system on chip as claimed in claim 6, wherein the first memory controller comprises a register where an access control value on the first memory is registered,
wherein the controlled switch selectively connects one of the first memory controller and the second memory controller with the bus according to the access control value,
wherein the CPU disables access to the first memory by changing the access control value when the use of the first memory by the CPU is completed.

8. The system on chip as claimed in claim 1, further comprising:
a memory controller communicatively coupled to the CPU, including at least one switch to select a connection state with the external non-volatile memory,
wherein the memory controller selectively outputs a writing signal received from the CPU to the external non-volatile memory according to a result of a comparison between a first key value and a second key value.

9. The system on chip as claimed in claim 8, wherein the memory controller controls the at least one switch to select the connection state so as to output the writing signal to the external non-volatile memory when the first key value and the second key value are the same.

10. The system on chip as claimed in claim 8, wherein the memory controller controls the at least one switch so as to disable the connection to the external non-volatile memory so as to prevent the writing signal from being output to the external non-volatile memory.

11. The system on chip as claimed in claim 10, wherein the memory controller controls a read operation of the external non-volatile memory even when the memory controller is preventing the writing signal from being output to the external non-volatile memory.

12. The system on chip as claimed in claim 8, wherein the at least one switch includes a first switch and a second switch, with the memory controller to control the first switch so as to control a read operation of the external memory, and the second switch to control a connection with the second switch so as to control the output of the writing signal to the external non-volatile memory.

13. The system on chip as claimed in claim 1, further comprising;
a code generating unit to generate a software code, wherein the CPU performs initializing by using the software code.

14. The system on chip as claimed in claim 13, wherein the code generating unit comprises:
an address decoder to receive an address from the CPU and to decode the address;
a plurality of registers; and a multiplexer to generate the software code by selectively reading register values stored in the plurality of registers according to an address decoded in the address decoder, and by combining the register values.

15. The system on chip a claimed in claim 13, wherein the code generating unit comprises:
an address decoder to receive an address from the CPU and to decode the address;
a first generating unit to generate an instruction address from the address decoded in the address decoder;
a plurality of instruction registers to be divided into a plurality of groups;
a plurality of instruction multiplexers to read selectively a register value from the plurality of instruction registers according to the instruction address;
a code formatter to generate a code by combining values read in the plurality of instruction multiplexers;
a second generating unit to generate a data address from the address decoded in the address decoder;
a plurality of data registers;
a data multiplexer to read selectively register values from the plurality of data registers according to the data address and to combine the read values; and
a multiplexer to generate the software code by combining a code generated in the code formatter with data combined in the second multiplexer.

16. The system on chip as claimed in claim 1, further comprising;
a memory controller to control access to the external non volatile memory,
wherein the memory controller, when a writing signal on the external non volatile memory and a first key value are transmitted from the CPU, compares the first key value with a pre-stored second key value, and when the values are the same with each other, performs a writing operation on the external non volatile memory according to the writing signal.

17. The system on chip as claimed in claim 16, wherein when the first key value and the pre-stored second key value are different from one another, the memory controller blocks a writing operation to the external non volatile memory.

18. The system on chip as claimed in claim 16, wherein the memory controller comprises:
a signal transferring unit to store the first key value transmitted from the CPU;
a key value storage to store the second key value;
a comparing unit to compare the first key value stored in the signal transferring unit with the second key value stored in the key value storage; and a signal processor to output the writing signal transmitted from the CPU to the external non volatile memory according to the compared result.

19. The system on chip as claimed in claim 1, wherein the penalty function includes one or more of emitting a voice message indicating that authentication has failed, displaying a visual message indicating that the authentication has failed, enabling an image forming apparatus to be turned on, and disabling a state in which printing is possible.

20. The system on chip as claimed in claim 1, wherein when the number of times that the decryption of the encrypted data fails is less than the threshold, the decryption of the encrypted data is again performed.

21. A method of booting of an image forming apparatus comprising a non-volatile memory and a system on chip, the method comprising:
initializing the image forming apparatus using initialization data which is stored in a first memory of the system on chip;
when the initializing is performed, decrypting encrypted data which is stored in the non-volatile memory using one of a plurality of decryption keys which are stored in the first memory;
counting a number of times that the decryption of the encrypted data fails;
performing a penalty function when the number of times that the decryption of the encrypted data fails is more than a threshold;
storing the decrypted data in a second memory of the system on chip;
performing a boot operation using data which is stored in the second memory; and
restricting access to a CPU of the system on chip via an external port during the boot operation;
when the image forming apparatus is turned on, identifying a memory that is designated according to an input value input through a third memory of the system on chip or an external pin;
when the designated memory is the first memory, disabling access to the CPU of the system on chip;
when at least the decryption and authentication of the decrypted data is completed, enabling the access to the CPU;
when system preparation is completed, disabling the access to the first memory; and
performing register setting to change the access to the first memory to access to the second memory.

* * * * *